United States Patent
Hamm et al.

(10) Patent No.: US 12,458,778 B2
(45) Date of Patent: Nov. 4, 2025

(54) OPTIMIZED CATHETER SHEATH FOR RX CATHETER

(71) Applicant: CANON U.S.A., INC., Melville, NY (US)

(72) Inventors: Mark Alan Hamm, Lynnfield, MA (US); Albert Harold Dunfee, Newbury, MA (US)

(73) Assignee: Canon U.S.A., Inc., Melville, NY (US)

( * ) Notice: Subject to any disclaimer, the term of this patent is extended or adjusted under 35 U.S.C. 154(b) by 343 days.

(21) Appl. No.: 17/138,271

(22) Filed: Dec. 30, 2020

(65) Prior Publication Data

US 2022/0040454 A1 Feb. 10, 2022

Related U.S. Application Data

(60) Provisional application No. 63/062,202, filed on Aug. 6, 2020.

(51) Int. Cl.
| | |
|---|---|
| *A61M 25/01* | (2006.01) |
| *A61M 25/00* | (2006.01) |
| *A61M 25/09* | (2006.01) |

(52) U.S. Cl.
CPC .... *A61M 25/0158* (2013.01); *A61M 25/0026* (2013.01); *A61M 25/0045* (2013.01);
(Continued)

(58) Field of Classification Search
CPC .. A61M 2025/0059; A61M 2025/0183; A61M 25/0026; A61M 25/0069;
(Continued)

(56) References Cited

U.S. PATENT DOCUMENTS

| | | | |
|---|---|---|---|
| 4,739,768 | A | 4/1988 | Engelson |
| 4,988,356 | A | 1/1991 | Crittenden et al. |

(Continued)

FOREIGN PATENT DOCUMENTS

| | | |
|---|---|---|
| JP | H06-134034 A | 5/1994 |
| JP | 2006-297063 A | 11/2006 |

(Continued)

OTHER PUBLICATIONS

Engineering Properties of Polyethylene, 2005, American Water Works Association Manual, M55, Chapter 1 pp. 1-17 (Year: 2005).*

(Continued)

*Primary Examiner* — Loan B Jimenez
*Assistant Examiner* — Kathleen Paige Farrell
(74) *Attorney, Agent, or Firm* — Canon U.S.A., Inc. IP Division

(57) ABSTRACT

A catheter configured for placement within a bodily lumen, comprises: a catheter sheath defining a first lumen for medical tools; and an exchange segment defining a second lumen for a guidewire. A proximal end of the exchange segment is joined with a distal end of the catheter sheath in a lengthwise direction forming an angle therebetween, such that the second lumen is laterally offset by a distance and angled with respect to the first lumen. When the catheter is placed within a patient's anatomy, the catheter sheath and/or the exchange segment straightens out so that the axis of the second lumen and the axis of the first lumen become substantially parallel to each other. The offset distance between the axes of sheath and exchange segment depends mainly on the diameter of the guidewire to be used, on the diameter of the sheath, and the angle of the junction.

22 Claims, 8 Drawing Sheets

(52) U.S. Cl.
CPC .... *A61M 25/0053* (2013.01); *A61M 25/0108* (2013.01); *A61M 25/09* (2013.01); *A61M 2025/0058* (2013.01); *A61M 2025/0059* (2013.01); *A61M 2025/0183* (2013.01)

(58) Field of Classification Search
CPC .......... A61M 25/0067; A61M 25/0068; A61M 25/0054; A61M 25/0052; A61M 25/0053; A61M 25/0158; A61M 25/0045; A61M 25/0108; A61M 25/09; A61M 2025/0058; A61M 25/01; A61M 2025/0177; A61M 25/0169; A61M 25/0021; A61M 25/0023; A61M 25/005; A61M 25/0074; A61M 25/008; A61M 25/0082; A61M 2025/0063; A61M 2025/0081; A61M 2025/09175; A61M 25/0013; A61M 25/0043; A61B 8/12; A61B 5/0084; A61B 5/6852; A61B 1/00071; A61B 5/0073; A61B 1/01; A61B 8/445; A61B 1/0615; A61B 1/07
See application file for complete search history.

(56) References Cited

U.S. PATENT DOCUMENTS

| | | | |
|---|---|---|---|
| 5,383,853 A | 1/1995 | Jung et al. | |
| 6,004,291 A | 12/1999 | Ressemann et al. | |
| 6,482,171 B1 | 11/2002 | Corvi et al. | |
| 6,503,223 B1* | 1/2003 | Sekido et al. | A61M 25/104 |
| 6,712,766 B2 | 3/2004 | Harada | |
| 6,960,186 B1* | 11/2005 | Fukaya | A61M 25/1027 604/103.06 |
| 8,834,510 B2 | 9/2014 | Wilson et al. | |
| 9,089,669 B2 | 7/2015 | Haslinger et al. | |
| 9,205,223 B2 | 12/2015 | Wilson et al. | |
| 9,352,116 B2 | 5/2016 | Guo et al. | |
| 9,492,636 B2 | 11/2016 | Heideman et al. | |
| 9,622,706 B2 | 4/2017 | Dick et al. | |
| 10,022,518 B2 | 7/2018 | Yamashita et al. | |
| 10,039,522 B2 | 8/2018 | Magnin et al. | |
| 10,299,757 B2 | 5/2019 | Yamashita et al. | |
| 10,653,434 B1 | 5/2020 | Yang et al. | |
| 2001/0037073 A1 | 11/2001 | White et al. | |
| 2001/0044624 A1 | 11/2001 | Seraj et al. | |
| 2008/0021275 A1 | 1/2008 | Tearney et al. | |
| 2008/0183128 A1* | 7/2008 | Morriss | A61M 3/0283 604/35 |
| 2009/0018393 A1 | 1/2009 | Dick et al. | |
| 2009/0163818 A1 | 6/2009 | Zelenka et al. | |
| 2010/0057019 A1 | 3/2010 | Zelenka | |
| 2010/0210937 A1 | 8/2010 | Tearney et al. | |
| 2011/0144581 A1 | 6/2011 | Irwin et al. | |
| 2011/0160834 A1 | 6/2011 | Aggerholm | |
| 2012/0303054 A1 | 11/2012 | Wilson et al. | |
| 2013/0023771 A1* | 1/2013 | Zelenka | A61M 25/0054 600/467 |
| 2014/0180076 A1 | 6/2014 | Stigall et al. | |
| 2014/0309533 A1 | 10/2014 | Yamashita et al. | |
| 2016/0038321 A1 | 2/2016 | Shumer et al. | |
| 2016/0220785 A1 | 8/2016 | Fabro | |
| 2017/0055943 A1* | 3/2017 | Zelenka | A61B 8/12 |
| 2017/0274179 A1 | 9/2017 | Sullivan et al. | |
| 2018/0085557 A1 | 3/2018 | Gerrans et al. | |
| 2018/0214120 A1 | 8/2018 | Sakaguchi et al. | |
| 2019/0082965 A1 | 3/2019 | Barone et al. | |
| 2019/0083062 A1* | 3/2019 | Barone | A61B 8/445 |
| 2019/0240434 A1* | 8/2019 | Blank | A61M 16/0459 |
| 2019/0351182 A1* | 11/2019 | Chou | A61M 39/06 |
| 2020/0147347 A1* | 5/2020 | Cottone | A61B 17/22 |
| 2020/0187790 A1 | 6/2020 | Milner et al. | |
| 2020/0330664 A1* | 10/2020 | Ship | A61M 25/0043 |
| 2021/0128107 A1* | 5/2021 | Hakkens | G01S 7/52085 |

FOREIGN PATENT DOCUMENTS

| | | |
|---|---|---|
| JP | 2010-533049 A | 10/2010 |
| JP | 2012-501225 A | 1/2012 |
| JP | 2015-506749 A | 3/2015 |
| WO | 96/10434 A1 | 4/1996 |

OTHER PUBLICATIONS

International Association of Plastics Distributors (IAPD), Typical Properties of Polyethylene, 2005 from https://www.plastecprofiles.com/materials.html#UHMW (Year: 2005).*
Roth, R., "Design Consideration in Small-Diameter Medical Tubing", Medical Device & Diagnostic Industry, Jan. 2001.
Slade, P., et al., "Design of a Soft Catheter for Low-Force and Constrained Surgery", Sep. 2017.
Hijikata, R., et al., "Evaluation of Mechanical Properties of Catheter Shafts under Cyclic Bending", Materials Transactions, 2017, pp. 1049-1054, vol. 58, No. 7.
Novais, V. R., et al., "Flexural modulus, flexural strength, and stiffness of fiber-reinforced posts", Indian Journal of , Dental Research, 2009. pp. 277-281, vol. 20, No. 3.
Technical Solutions, Hypotubes and hypotube shafts for Minimally Invasive balloon catheters, www.creganna.com/technologies/metal-shafts/technical-solutions/; accessed May 1, 2020.
"Mechanical Properties of Catheters", Acta Radiologica: Diagnosis, 1966, pp. 11-22.
Chandrasekaran, V., et al., "Image Analysis to Quantitatively Estimate Catheter Bending Stiffness", Mechanical Engineering and Materials Science Independent Study, Jan. 10, 2020.
"Metal Shafts and Hypotubes", https://www.te.com/usa-en/industries/medical-healthcare/our-focus/interventional/metal-shafts.html; accessed on May 1, 2020.

* cited by examiner

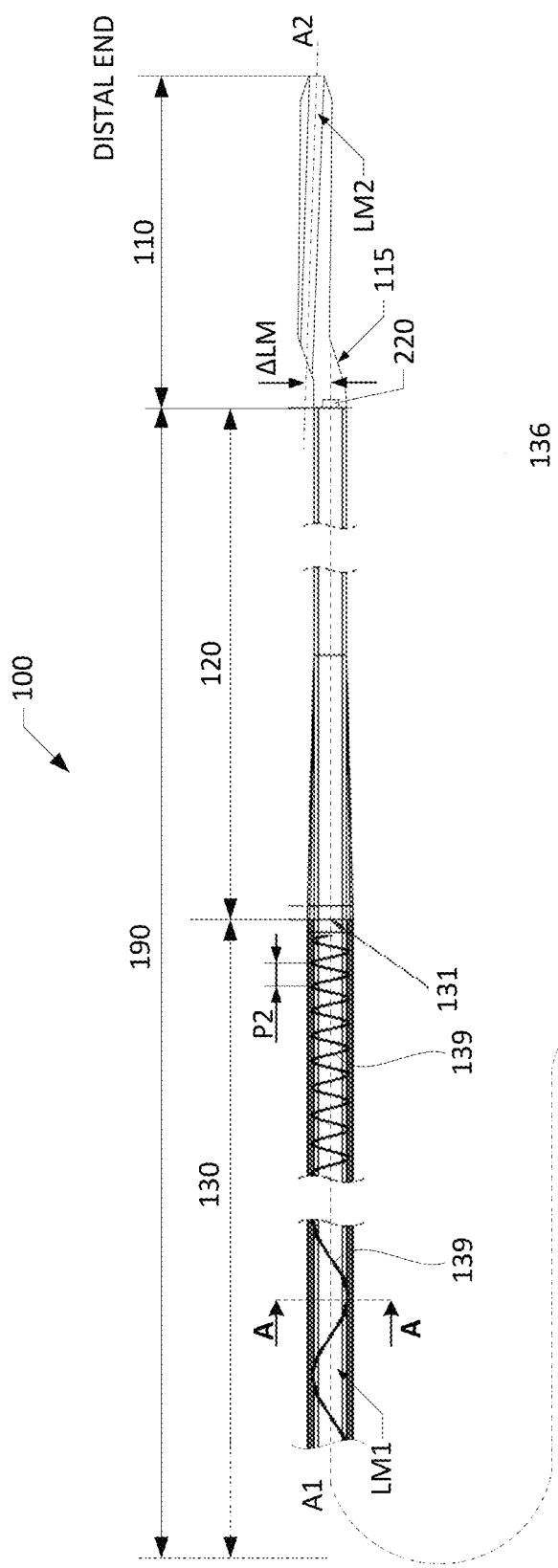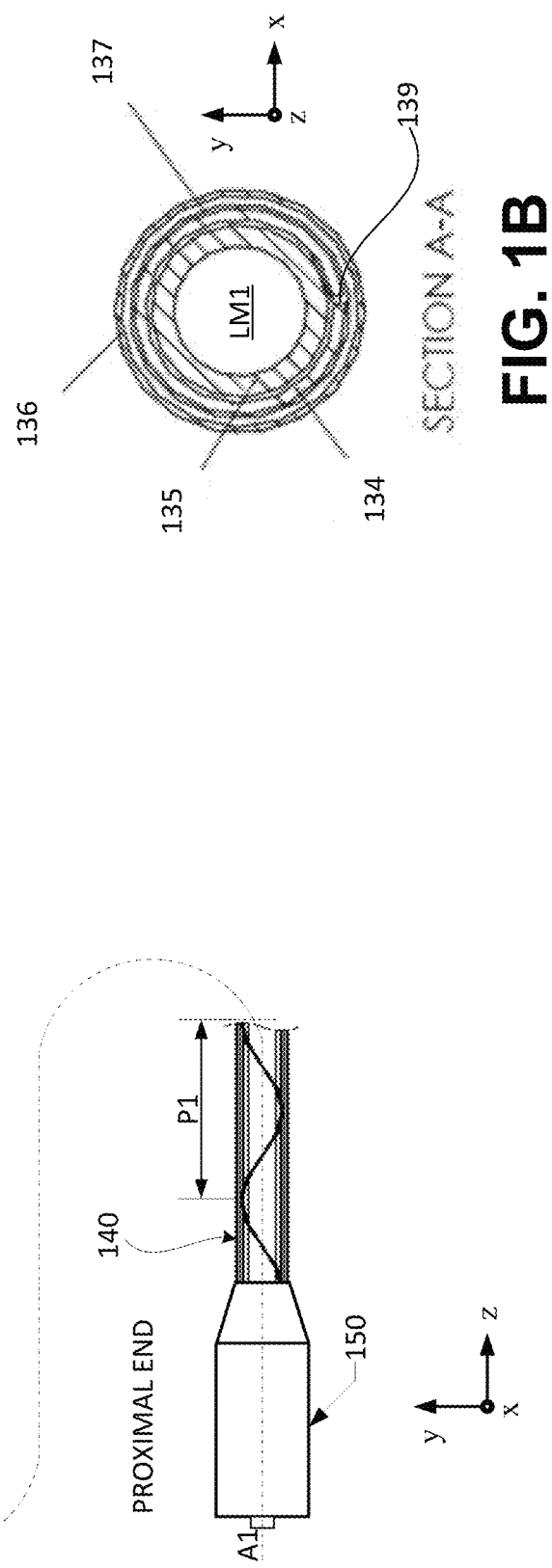
FIG. 1A
FIG. 1B

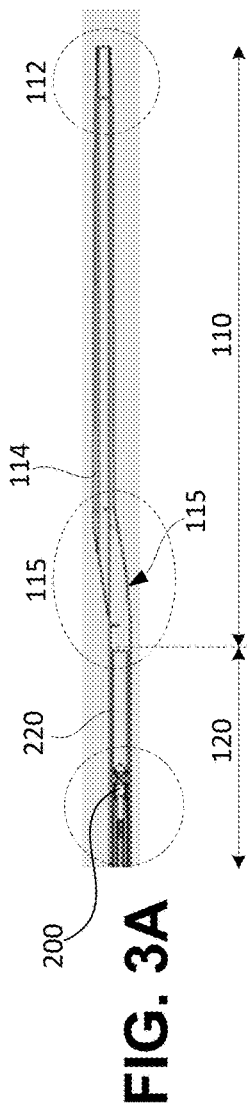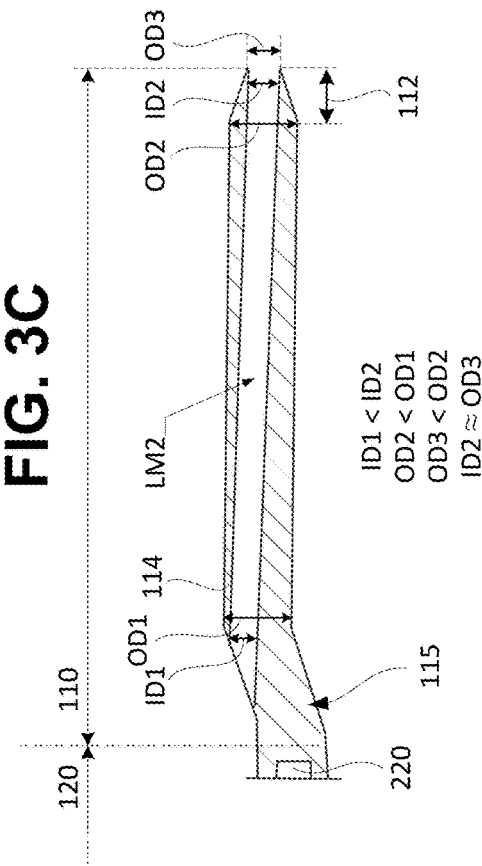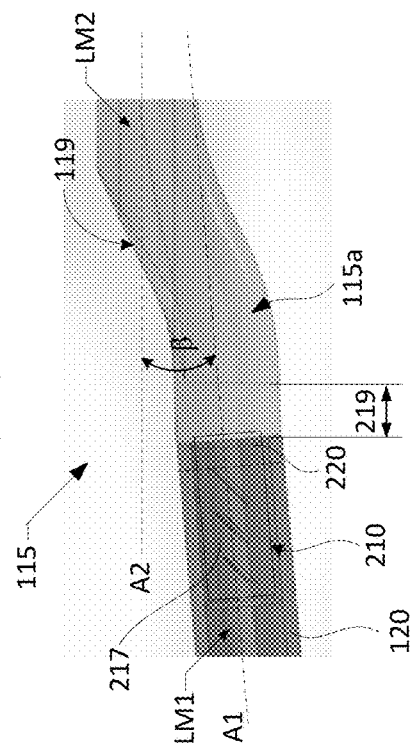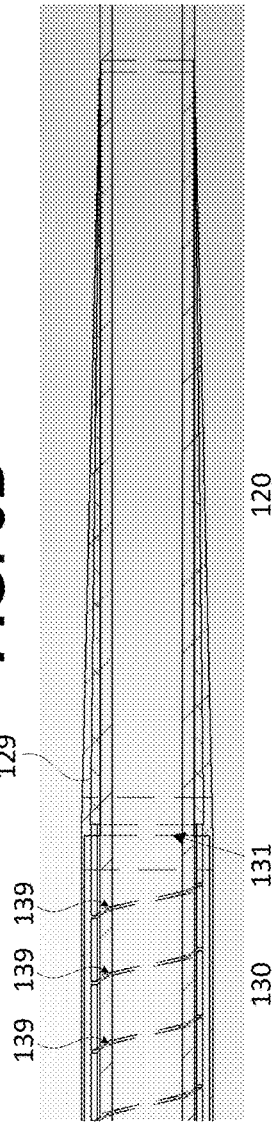

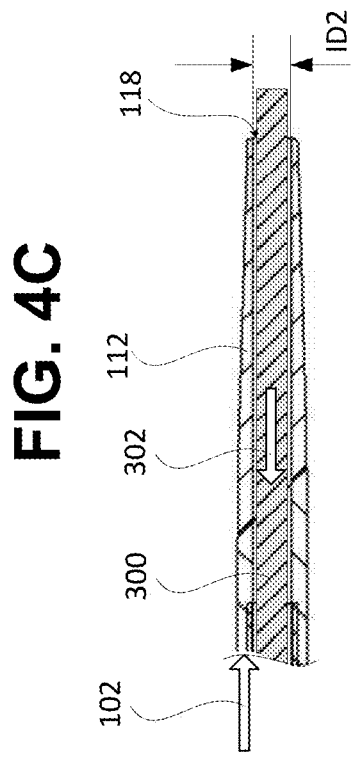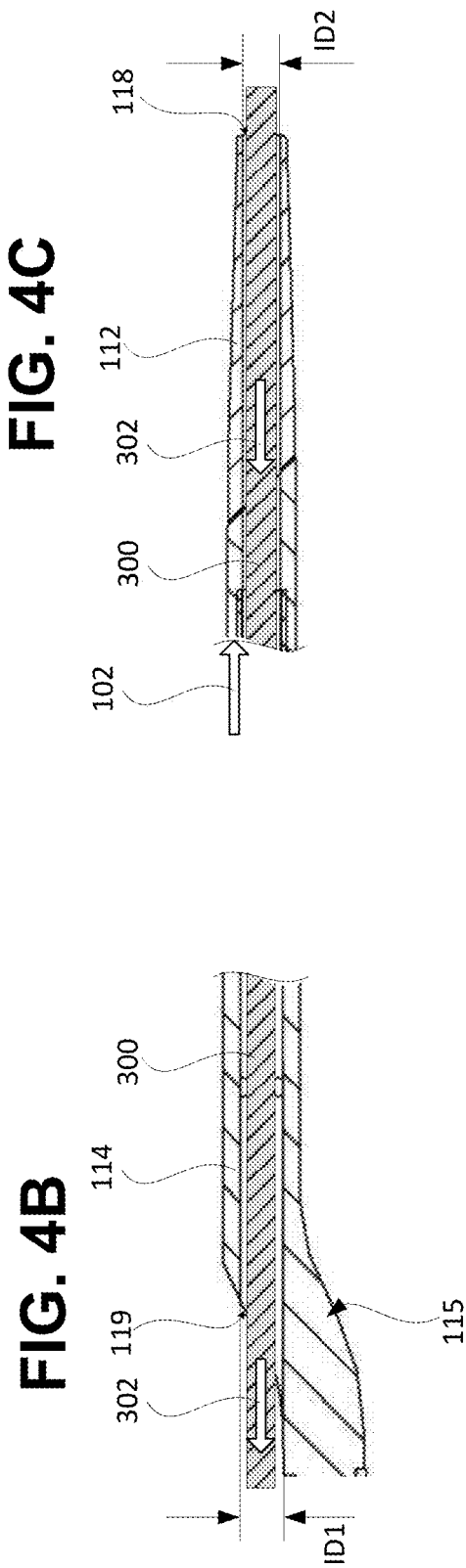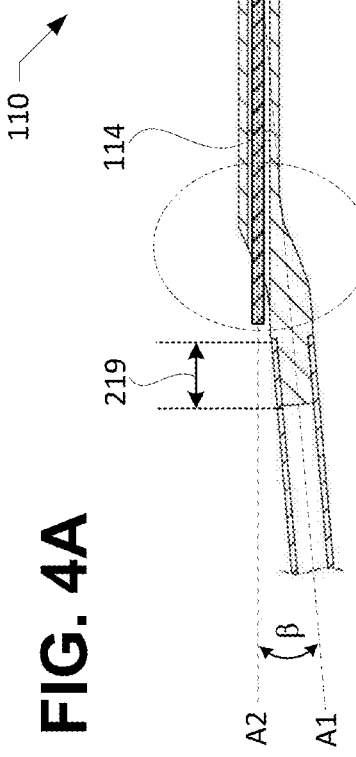

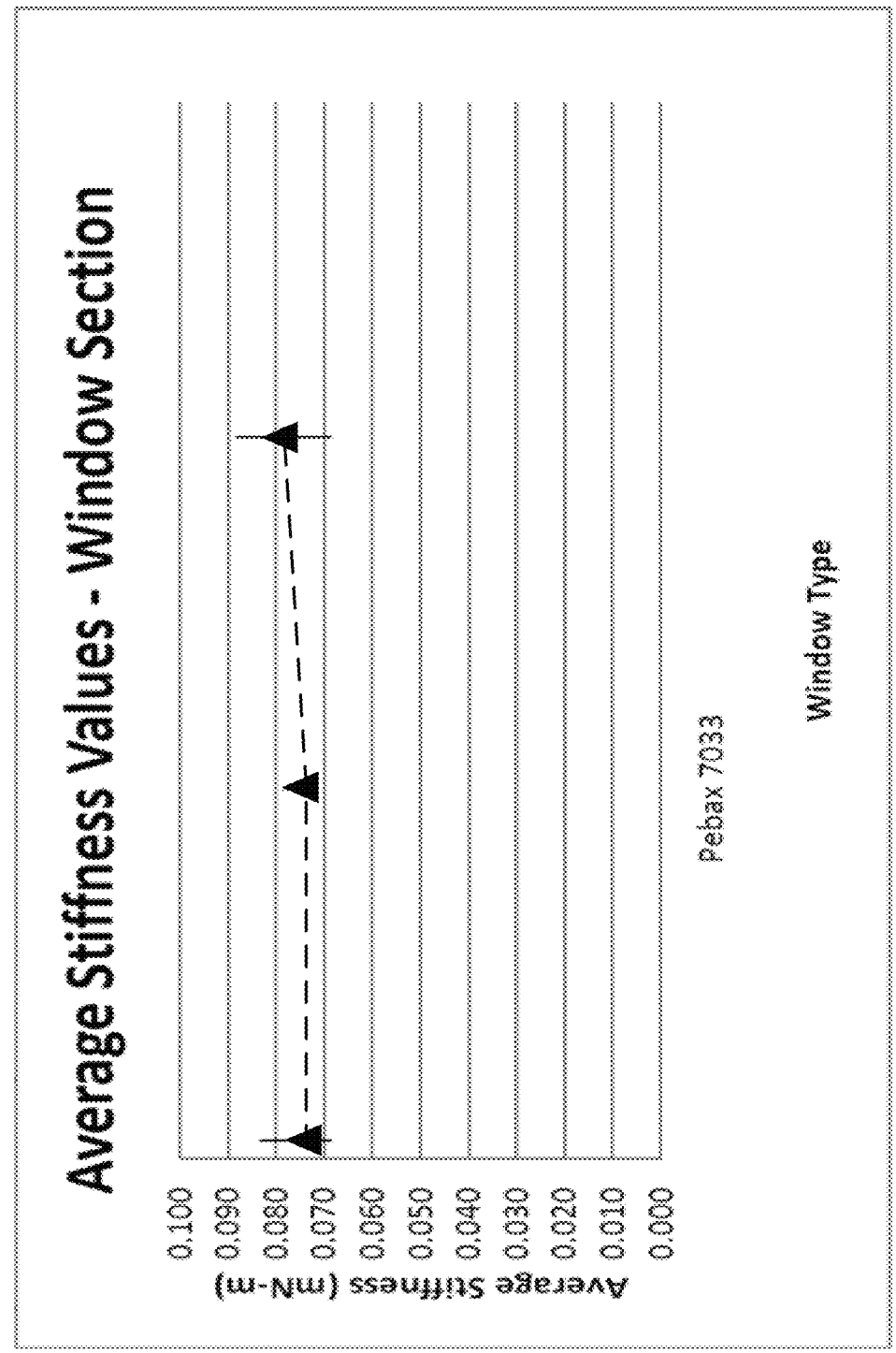

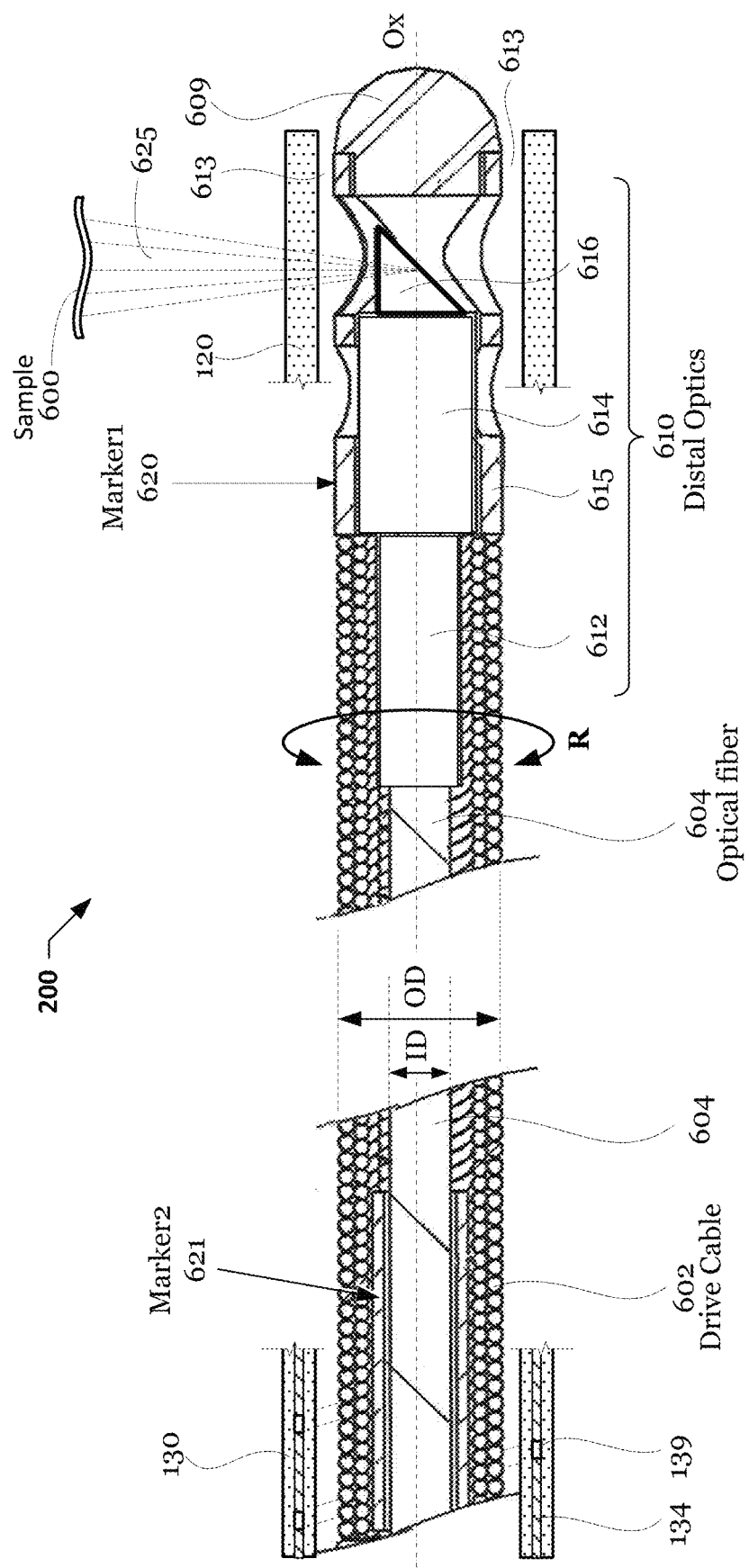

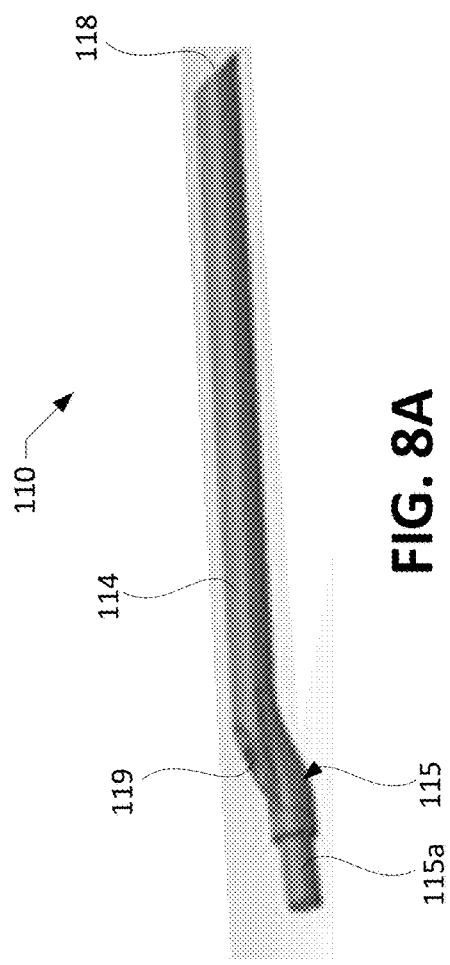
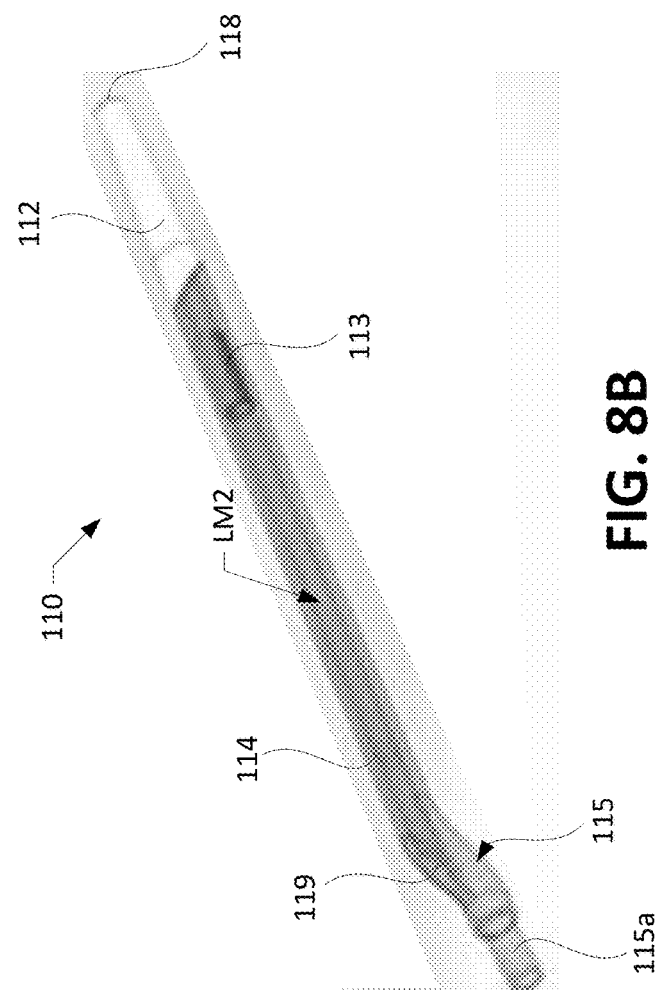
FIG. 8A
FIG. 8B

OPTIMIZED CATHETER SHEATH FOR RX CATHETER

CROSS-REFERENCE TO RELATED APPLICATIONS

This application claims priority to U.S. Provisional Application No. 63/062,202, filed Aug. 6, 2020, the content of which is incorporated by reference herein in its entirety.

BACKGROUND INFORMATION

Field of Disclosure

The present disclosure generally relates to medical devices. More particularly, the disclosure exemplifies an optimized catheter sheath applicable to rapid exchange catheters and the like.

Description of Related Art

Catheters comprise thin elongate tube-like (tubular) instruments made of biocompatible materials and configured to be inserted into a patient's body for diagnostic or therapeutic purposes in medical procedures known as "catheterizations". A variety of medical catheterization procedures involve the use of a long guidewire over which a flexible catheter can be threaded so that the guidewire can guide the catheter to an intended target location in the patient's body. Endovascular catheterization procedures typically include inserting a guidewire through an access artery (e.g., brachial, femoral, or radial artery) and passing it to a vessel of interest within the vasculature, and then sending the catheter over the guidewire. For example, a cerebral catheterization procedure involves inserting a catheter into an artery in the leg of a patient, and passing it up to the blood vessels in the brain. The use of a guidewire reduces the risk of trauma to the patient by the tip of the advancing catheter and enables quick catheter deployment.

A guidewire is a very thin wire typically made of steel, nitinol, tungsten or other similar material designed to navigate through the patient's anatomy (e.g., from the access artery to a vessel) and quickly reach a lesion area (vessel segment) under image guided control. Once the tip of the guidewire has been navigated to the desired location inside the patient's body, the catheter can be threaded over and along the guidewire, with the wire providing support and guidance for the flexible catheter. If the initial catheter must be exchanged for one of a different size, the first catheter is withdrawn over the guidewire and another catheter is slid into place over the guidewire. This process can lead to lengthy procedure times. Catheter and guidewires sizes are standardized for specific applications, and their respective dimensions are not easily changeable. Catheter diameters are measured in French (Fr) units, e.g., $1 Fr = 1/3$ millimeters (mm) or $1 Fr = 0.013$ inches (in), and guidewire diameters are measured in inches, e.g., 0.018 and 0.035 guidewires are 0.018 and 0.035 inches in diameter, respectively. In order to ameliorate catheter exchangeability and reduce the length of procedural time, catheter design has continuously improved by modifying the catheter structure while maintaining the standardized dimensions substantially unchanged.

A type of catheter design for reducing procedure time is known as a rapid exchange (Rx) design. An Rx catheter design includes a guidewire lumen that extends only through the distal portion of the catheter. In a rapid exchange catheter, the guidewire lumen begins at a distal tip of the catheter and ends at a guidewire exit port, which is located on a side of the distal portion of the catheter and faces the vessel wall surface. In this configuration, the guidewire passes through the catheter shaft only for a segment of the length of the catheter shaft, and the catheter can be moved along the guidewire in a "monorail" fashion. However, because the guidewire exits at least partially to the side of the catheter and then extends in parallel to the catheter, this configuration increases the vessel diameter requirements (i.e., the vessel must fit the combined diameters of the catheter and the guidewire).

Regardless of whether the catheter uses a long wire or rapid exchange type guidewire arrangement, the catheter's ability to bend and advance effectively through the patient's anatomy is commonly defined by parameters known as "trackability" and "pushability" of the catheter. Trackability is often understood as the catheter's ability to navigate through tortuous anatomies, and is namely defined by the flexibility of the catheter. Pushability refers to the effective transmission of longitudinal forces along the catheter from its proximal end to its distal end without kinking, so that a physician can push the catheter through the vascular or other luminal system including through stenosed regions of the lumen. Effective catheters should be trackable and pushable to effectively navigate through difficult curves and/or obstructions in the patient's anatomy.

In coronary catheters, it has been recognized that transition in flexibility should be gradual from the stiff proximal section to the more flexible distal sections to minimize kinking and to more effectively transfer push and torsional forces to the distal end of the catheter. Therefore, there are numerous types of catheters on the market today with varying designs, materials, construction methods and dimensional tolerances. See, for example, the following patents and patent application publications U.S. Pat. Nos. 4,739,768, 4,988,356, 6,004,291, and US 2009/0018393 the disclosures of which are incorporated by reference herein for all purposes.

In other words, there are no common design parameters and/or materials for catheters in general or the different sections thereof. Instead, each design is optimized to meet the individual needs of its application using materials that are deemed adequate by the designer and/or designing organization. For example, in coronary catheterization, sheath diameters that are compatible with 5 Fr or 6 Fr guide catheters and 0.014 inch diameter guidewires are common. However, the structures of these catheters can change significantly depending on the designer, manufacturer, or even model number. This makes it difficult for a user to decide on the most appropriate solution for a given catheterization procedure.

There is a need to identify and rank the contribution of each desirable attribute that helps a catheter navigate efficiently into and through tortuous anatomies. Parameters such as materials, diameter, stiffness, lubricity, geometry, dimensions and tolerances thereof, are all in some way factors that either help or hinder catheter navigation. Additionally, if the catheter is designed for use with an imaging core, the imaging core can either help or hinder good catheter navigation within a tortuous anatomy. For example, if the imaging core is too stiff it can dominate the overall catheter stiffness and make an otherwise good catheter kink in the area distal to the imaging core when tight bends are encountered. Therefore, the imaging core should be of adequate stiffness and/or rigidity, both in torsion to facilitate accurate imaging, and also in lateral rigidity, which must be limited so it does not cause a catheter sheath to kink.

SUMMARY OF EXEMPLARY EMBODIMENTS

According to at least one embodiment of the present disclosure, there is provided a catheter apparatus having an optimized catheter sheath and a rapid exchange catheter. According to one example embodiment, a catheter (100) configured for placement within a biological lumen, includes: a tubular sheath (190) defining a first lumen (LM1) which extends from a proximal end to a distal end of the tubular sheath; and a rapid exchange segment (110) configured to be mated with the tubular sheath (190) at the distal end thereof. The rapid exchange segment (110) has a guidewire entry port 118 and a guidewire exit port (119), and defines a second lumen (LM2). The tubular sheath (190) and the rapid exchange segment (110) are mated together in a manner such that the second lumen (LM2) is longitudinally offset and angled with respect to the first lumen (LM1).

This disclosure teaches various example embodiments of desirable catheter design elements, features, geometry, materials and processes necessary to obtain optimized catheter tracking and navigation properties through tortuous anatomies, such as the coronary vasculature. In one example embodiment, the catheter design is optimized for coronary imaging catheters that employ a rotating imaging core. To that end, the present disclosure teaches certain rarely discussed desirable features of the catheter sheath and imaging core, and specifically discloses the interaction between catheter sheath and imaging core needed to ensure that the catheter can seamlessly navigate to a desired target destination within the coronary anatomy. Some of the embodiments are generic to non-Rx catheters intended to access other parts of the anatomy such as peripheral applications. But most of the attributes in this disclosure, including imaging catheter sheaths and size ranges thereof, are particularly optimized for coronary applications. Intra-cranial access catheters are also described as another example of an Rx catheter application.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

Further objects, features and advantages of the present disclosure will become apparent from the following detailed description when taken in conjunction with the accompanying figures showing illustrative embodiments of the present disclosure.

FIG. 1A illustrates an exemplary embodiment of a catheter 100 comprising a rapid exchange section 110 and catheter sheath 190, according to the present disclosure. FIG. 1B illustrates a cross-sectional view of a mid-shaft section 130 of the catheter sheath 190.

FIG. 3A shows another exemplary embodiment of a catheter 100 including an imaging core 200 arranged in a window section 120 of the catheter sheath 190. FIG. 3B illustrates an angled joint 115 showing attachment of the rapid exchange section 110 to the window section 120. FIG. 3C illustrates structural details of the rapid exchange section 110. FIG. 3D illustrates details of transition from the mid-shaft section 130 to the window section 120.

FIG. 4A, FIG. 4B, FIG. 4C illustrate further details of the rapid exchange section 110.

FIG. 5 is a graph of Stiffness values for the window section 120.

FIG. 6 illustrates an exemplary embodiment of the imaging core 200.

FIG. 8A shows an example embodiment of the rapid exchange section 110 without the distal tip 112 prior to assembly with the catheter sheath 190. FIG. 8B shows an example embodiment of the rapid exchange section 110 after assembly with the distal tip 112, and prior to assembly with the catheter sheath 190.

DETAILED DESCRIPTION OF EXEMPLARY EMBODIMENTS

Figure 2A:
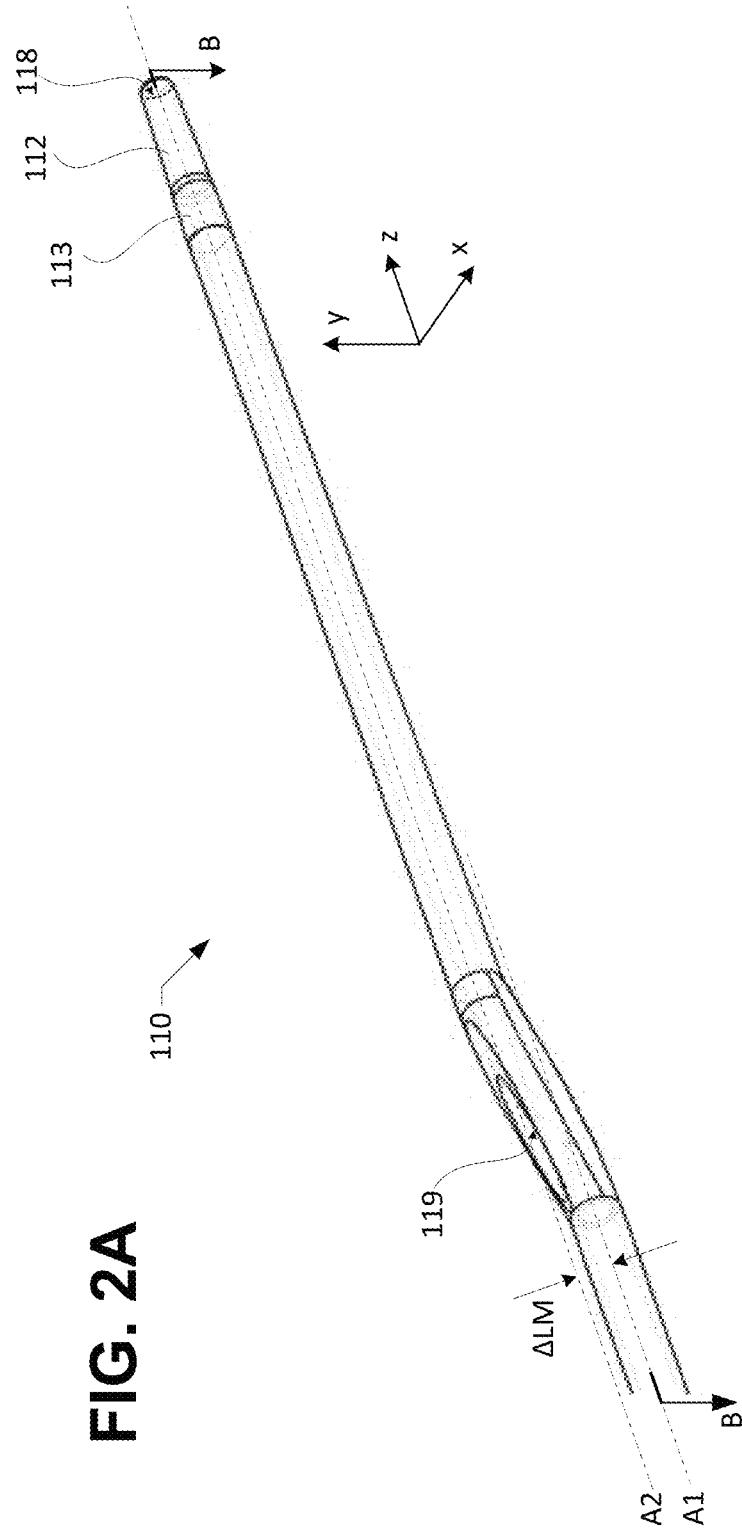
FIG. 2A shows a perspective view and FIG. 2B shows a cross-sectional view of a rapid exchange section 110 of the catheter 100.

The following description of certain examples and embodiments of an optimized catheter sheath having a rapid exchange segment should not be used to limit the scope of the claims. Throughout the figures, the same reference numerals and characters, unless otherwise stated, are used to denote like features, elements, components or portions of the illustrated embodiments. In addition, while the subject disclosure is described in detail with reference to the enclosed figures, it is done so in connection with illustrative exemplary embodiments. It is intended that changes and modifications can be made to the described exemplary embodiments without departing from the true scope and spirit of the subject disclosure as defined by the appended claims. Although the drawings represent some possible configurations and approaches, the drawings are not necessarily to scale and certain features may be exaggerated, removed, or partially sectioned to better illustrate and explain certain aspects of the present disclosure. The descriptions set forth herein are not intended to be exhaustive or otherwise limit or restrict the claims to the precise forms and configurations shown in the drawings and disclosed in the following detailed description.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached", "coupled" or the like to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown in one embodiment can apply to other embodiments. It will also be appreciated by those of skill in the art that references to a structure or feature that is disposed "adjacent" to another feature may have portions that overlap or underlie the adjacent feature.

The terms first, second, third, etc. may be used herein to describe various elements, components, regions, parts and/or sections. It should be understood that these elements, components, regions, parts and/or sections are not limited by these terms of designation. These terms of designation have been used only to distinguish one element, component, region, part, or section from another region, part, or section. Thus, a first element, component, region, part, or section discussed below could be termed a second element, component, region, part, or section merely for purposes of distinction but without limitation and without departing from structural or functional meaning.

As used herein, the singular forms "a", "an", and "the" are intended to include the plural forms as well, unless the context clearly indicates otherwise. It should be further understood that the terms "includes" and/or "including", "comprises" and/or "comprising", "consists" and/or "consisting" when used in the present specification and claims, specify the presence of stated features, integers, steps, operations, elements, and/or components, but do not preclude the presence or addition of one or more other features, integers, steps, operations, elements, components, and/or groups thereof not explicitly stated. Further, in the present disclosure, the transitional phrase "consisting of" excludes any element, step, or component not specified in the claim. It is further noted that some claims or some features of a claim may be drafted to exclude any optional element; such claims may use exclusive terminology as "solely," "only" and the like in connection with the recitation of claim elements, or it may use of a "negative" limitation.

The term "about" or "approximately" as used herein means, for example, within 10%, within 5%, or less. In some embodiments, the term "about" may mean within measurement error. In this regard, where described or claimed, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range, if recited herein, is intended to be inclusive of end values and includes all sub-ranges subsumed therein, unless specifically stated otherwise. As used herein, the term "substantially" is meant to allow for deviations from the descriptor that do not negatively affect the intended purpose. For example, deviations that are from limitations in measurements, differences within manufacture tolerance, or variations of less than 5% can be considered within the scope of substantially the same. The specified descriptor can be an absolute value (e.g. substantially spherical, substantially perpendicular, substantially concentric, etc.) or a relative term (e.g. substantially similar, substantially the same, etc.).

Unless specifically stated otherwise, as apparent from the following disclosure, it is understood that, throughout the disclosure, discussions using terms such as "processing," "computing," "calculating," "determining," "displaying," or the like, refer to the action and processes of a computer system, or similar electronic computing device, or data processing device that manipulates and transforms data represented as physical (electronic) quantities within the computer system's registers and memories into other data similarly represented as physical quantities within the computer system memories or registers or other such information storage, transmission or display devices. Computer or electronic operations described in the specification or recited in the appended claims may generally be performed in any order, unless context dictates otherwise. Also, although various operational flow diagrams are presented in a sequence(s), it should be understood that the various operations may be performed in other orders than those which are illustrated or claimed, or operations may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "in response to", "related to," "based on", or other like pasttense adjectives are generally not intended to exclude such variants, unless context dictates otherwise.

The present disclosure generally relates to medical devices, and it exemplifies embodiments of flexible shaft (sheath or sleeve) including an optical core which may be applicable to a spectroscopic apparatus (e.g., an endoscope), an optical coherence tomographic (OCT) apparatus, or a combination of such apparatuses (e.g., a multi-modality optical probe). The embodiments of the optical probe and portions thereof are described in terms of their state in a three-dimensional space. As used herein, the term "position" refers to the location of an object or a portion of an object in a three-dimensional space (e.g., three degrees of translational freedom along Cartesian X, Y, Z coordinates); the term "orientation" refers to the rotational placement of an object or a portion of an object (three degrees of rotational freedom—e.g., roll, pitch, and yaw); the term "posture" refers to the position of an object or a portion of an object in at least one degree of translational freedom and to the orientation of that object or portion of object in at least one degree of rotational freedom (up to six total degrees of freedom); the term "shape" refers to a set of posture, positions, and/or orientations measured along the elongated body of the object.

As it is known in the field of medical devices, the terms "proximal" and "distal" are used with reference to the manipulation of an end of an instrument extending from the user to a surgical or diagnostic site. In this regard, the term "proximal" refers to the portion (e.g., a handle) of the instrument closer to the user, and the term "distal" refers to the portion (tip) of the instrument further away from the user and closer to a surgical or diagnostic site. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

As used herein the term "catheter" generally refers to a flexible and thin tubular instrument made of medical grade material designed to be inserted through a narrow opening into a bodily lumen (e.g., a vessel) to perform a broad range of medical functions. The more specific term "optical catheter" refers to a medical instrument comprising an elongated bundle of one or more flexible light conducting fibers disposed inside a protective sheath made of medical grade material and having an optical imaging function. A particular example of an optical catheter is fiber optic catheter which comprises a sheath, a coil, a protector and an optical probe. In some applications a catheter may include a "guide catheter" which functions similarly to a sheath. Some embodiments may be applicable to an endoscope. As used herein the term "endoscope" refers to a rigid or flexible medical instrument which uses light guided by an optical probe to look inside a body cavity or organ. A medical procedure, in which an endoscope is inserted through a natural opening, is called endoscopy.

In the present disclosure, the terms "optical fiber", "fiber optic", or simply "fiber" refers to an elongated, flexible, light conducting conduit capable of conducting light from one end to another end due to the effect known as total internal reflection. The terms "light guiding component" or "waveguide" may also refer to, or may have the functionality of, an optical fiber. The term "fiber" may refer to one or more light conducting fibers. An optical fiber has a generally transparent, homogenous core, through which the light is guided, and the core is surrounded by a homogenous cladding. The refraction index of the core is larger than the refraction index of the cladding. Depending on design choice some fibers can have multiple claddings surrounding the core.

<Catheter General Parameters>

As noted above, it is desirable that transition in flexibility of the catheter sheath should be gradual from the proximal end to the distal end. More specifically, it is desirable a smooth and gradual transition from a stiff proximal section to more flexible distal sections to minimize kinking and to more effectively transfer push and torsional forces from the proximal end to the distal end of the catheter. In the present disclosure, to achieve smooth and gradual transition of stiffness, each section of the catheter is designed with specific attributes in terms of materials, durometer, dimensions, aspect ratios, etc., among other considerations.

It is well known that, when a catheter or guidewire is passed through a tortuous path (e.g., from the femoral artery into the aorta), the catheter is elastically deformed so that its shape is adapted to the shape of the vessels. When an advancing catheter tip touches a vessel wall, the forces acting on the catheter cause a deflection of the tip. The forces acting on the vessel wall should be as small as possible to minimize the risk of damage to the vessel wall or to the catheter itself. Therefore, catheters should have suitable mechanical characteristics concerning flexural rigidity, torsional rigidity, tensile strength, as well as buckling and kinking resistance. Another requirement is that a catheter should have a small outer diameter (OD) to navigate through small vessels, and a large inner diameter (ID) to permit high flow of contrast medium and easy passage of imaging and/or operating devices (tools). To provide a large ID and small OD as well as appropriate rigidity and tensile strength, the thickness of the catheter wall (wall thickness) must be carefully designed. Flexural rigidity refers to the bending of the catheter, while torsional rigidity refers to rotation. Desirably, a catheter should have high torsional rigidity for the twisting of the catheter, and low flexural rigidity to avoid kinking and buckling. However, it has been difficult to produce a catheter with a balanced increased level of torsional rigidity and reduced level of flexural rigidity.

Catheter Stiffness: In terms of stiffness, a catheter of the present disclosure is more stiff at the proximal end than the distal end, with gradually tapering stiffness from the proximal end towards the distal end. The catheter terminates with an atraumatic distal tip that may include a short rapid exchange segment that accepts a guidewire in concentric fashion so that the catheter is guided to the site of interest via the guidewire. Generally related to durometer and Flexural Modulus, stiffness is greatly affected by diameter size and wall thickness. In that regard, a larger profile catheter is much stiffer despite using the same durometer material.

In terms of bending stiffness, it is known that catheter stiffness is a major factor in the thrombogenesis (formation of a thrombus) encountered after central venous cannulation. Therefore, numerous methods have been designed to evaluate the bending stiffness and elastic behavior of all types of catheters. A well known method of measuring catheter stiffness is the cantilever beam technique; see, e.g., U.S. Pat. No. 6,406,442, which is incorporated by reference herein in its entirety. In this technique, the force "F" required to deflect or bend a beam of unsupported length "L" is related to an amount of deflection "y" by the following equation $y=(F \times L^3)/(3 \times E \times I)$, where E is the Young's modulus of the beam material, and I is momentum of inertia of the section of the beam. Since the factors that contribute to the bending stiffness of the beam are namely the modulus and the beam material, the stiffness of the beam ($E \times I$) can be calculated by determining the force required to deflect the beam a predetermined distance (deflection "y"), according to the following formula $EI=(F \times L^3)/(3 \times y)$. In the International System of Units, stiffness is typically measured in Newtons per meter (N/m) and sometimes it may be expressed in Imperial units in pounds (lbs) per inch. Catheter bending stiffness is sometimes also expressed in millinewton-meter (mN-m) units.

Profile and Column Strength: at the proximal end, the main limitation on catheter diameter is the size of the guide catheter used. But at the distal end, usually smaller diameter is better, as long as the catheter meets safety standards. Catheter size also delineates good column strength with most polymers, a necessary attribute when pushing a catheter through tortuous anatomy and vessels.

Since most modern catheters are made of reinforced polymers, "durometer" is the most common polymer attribute considered by catheter designers. Durometer is a measure of polymer hardness directly correlated to certain catheter requirements. Catheters with soft polymer tips minimize trauma, while catheters with flexible but hard tubular surfaces are preferred to resist abrasion from guidewires and/or instruments guided through the catheter. In either case, the durometer value correlates the "flexural modulus", a measure of polymer flexibility, to each section or surface of the catheter shaft. The flexural modulus of a material is a physical property denoting the ability for that material to bend. In mechanical terms, the flexural modulus is the ratio of stress to strain during a flexural deformation (bending) of the catheter.

The durometer hardness scale was developed by Albert Shore in the 1920s. It measures the depth of indentation into a polymer surface by a rigid object, known as a 'presser foot'. Indentation depth is dependent on hardness of the polymer, shape of the presser foot, pressure applied to the presser foot and duration of pressure. The American Society for Testing Materials (ASTM) establishes a total of 12 durometer scales, depending on the intended use and type of materials. ASTM testing scales are A, B, C, D, DO, E, M, O, OO, OOO, OOO-S, and R. Shore "A" scale uses a steel rod presser foot with a 350 conical taper that ends in a 0.031 inch (0.79 mm) diameter flat tip. The tip is applied with 1.8 pounds (822 grams) of force to the test piece. Shore D uses a similar steel rod with a 300 conical taper and a 0.004 inch radius (0.1 mm) rounded tip which is applied with 10 pounds (4.5 Kg) of force. The final value of the hardness depends on the depth of indentation by the presser foot. If the tip penetrates 0.1 inches (2.54 mm) or more, the durometer is zero for the scale. If it does not penetrate at all, the durometer is 100 for the scale. Shore values between 0 and 100 are proportional to the indentation between 0 and 0.1 inches.

Each ASTM scale results in a value between 0 and 100, with higher values indicating a harder material. However, different ASTM durometer scales often overlap. For example, a durometer of 90 on the A scale (i.e., 90 A Shore) is equal to a durometer of 40 on the D scale (i.e. 40 D Shore). The two most common scales, using slightly different measurement systems, are the ASTM D2240 type A and type D scales. The A scale is generally for softer plastics, while the D scale is for harder plastics and other polymer-based materials. Polymer flexibility is most accurately determined by the flexural modulus of a manufactured article; the flexural modulus (also referred to as "flex modulus", "flex mod", or "modulus") measures deformation of an article under a load. However, the durometer is sometimes used as surrogate for assessing flexibility of competing polymers, since a higher durometer correlates to a higher modulus. Tensile strength is the maximum stress that a material can withstand while being stretched or pulled before breaking. This is an important parameter for the process of extruding delicate thin walled tubes as well as for determining the tube's performance used in catheter technology. Catheters, balloons, and high pressure braided catheter guides (guide catheters) all rely on the tensile strength characteristics of a material. Materials such as polyimide (PI) and polyether ether ketone (PEEK) are among the materials with the highest pressure performance. In addition, to improve these characteristics, extruded tubes are often braided to add strength and reinforcement to the tubular structure.

Polyether block amide copolymer (e.g., Pebax® brand by Arkema) is a very common polymer used in the fabrication of catheter shafts. However, in the present application, other medical-grade thermoplastic polyurethane (TPU) and thermoplastic elastomer (TPE) materials are also applicable as tubing extrusion materials for medical catheter and endoscope devices that demand precision and consistency. Commonly known catheter tubing materials may include PVC, HDPE, Polyurethane, Nylon, PEBAX®, FEP, PFA, ETFE, PTFE (liners), PEEK, TPE, Grilamid®, among others.

In the present application, to fulfill the requirement of catheters having an atraumatic soft polymer tip and flexible but hard tubular surfaces to resist abrasion from guidewires and instruments, the durometer of the catheter sheath is varied along the length of the catheter according to each section of the catheter. The inner diameter and/or outer diameter of the catheter sheath are also varied according to each section of the catheter. In addition, along the length of the catheter, the wall thickness of the catheter sheath may also be varied according to a given section. Moreover, the different sections of the catheter can be optimized for specific catheter applications including, but not limited, to intra-coronary catheters, intra-cranial catheters, peripheral catheters, and Rx catheters.

<Catheter Structure>

Referring to FIG. 1A and FIG. 1B an overview of an example embodiment of catheter 100 is described, according to the present disclosure. FIG. 1A illustrates an overall structure of the catheter 100, as seen from the proximal end (left-hand side) to the distal end (right-hand side), according to an embodiment of the present disclosure. In a three-dimensional environment defined by Cartesian coordinates (x, y, z), the catheter length extends along the z-axis and the cross-section of the catheter is on the x-y plane. The catheter 100 comprises, from the proximal end to the distal end thereof, a catheter sheath 190 and a rapid exchange (Rx) section 110. In most embodiments, the Rx section 110 is much shorter than the catheter sheath 190. In at least one embodiment, the catheter sheath 190 is at least 50 times and up to 100 times longer than the monorail or Rx section 100. For example, when the catheter sheath is about 140 cm, the monorail section is about 20 mm (2 cm). The catheter sheath 190 is comprised of a proximal section 140, a mid-shaft section 130, and a window section 120. A catheter connector 150 is configured to connect the proximal section 140 of the catheter to a patient interface unit (PIU) 720, as explained later in more detail. The proximal section 140, the mid-shaft section 130, and the window section 120 together define at least one lumen (a first lumen) LM1.

The catheter sheath 190 is a generally cylindrical sheath or sleeve having an outer surface and an inner surface arranged coaxially to each other and defining a wall that encloses the first lumen LM1; the first lumen LM1 extends from the proximal end to the distal end along a longitudinal axis A1. The rapid exchange section 110 is also generally cylindrical in shape having an outer surface and an inner surface defining a wall that encloses a second lumen LM2; the second lumen LM2 extends along a longitudinal axis A2. The rapid exchange section 110 is attached distally to the catheter sheath 190 in a manner such that the first lumen LM1 and the second lumen LM2 are laterally offset from each other and the axis A1 of the catheter sheath 190 is at a small angle β with respect to the axis A2 of the rapid exchange section 110. In at least some embodiments, the inner surface and outer surface of the rapid exchange section 110 are not coaxial to each other.

The lumen LM1 in the catheter sheath section (i.e., the first lumen) is a channel for passing tools, imaging devices, and/or fluids from an outside of a patient's body to a target location inside the patient's body. The lumen LM2 in the rapid exchange section (i.e., the second lumen) is a channel for passing therethrough a guidewire of a predetermined size. Therefore, the first lumen (LM1) may also be referred to as a tool channel or working channel of the catheter, and the second lumen (LM2) may also be referred to as a guidewire (GW) lumen. It should be understood that the proximal section 140, the mid-shaft section 130 and the window section 120 would typically be formed as a single tubular body referred herein as the catheter sheath 190. However, for convenience of description, the catheter sheath 190 is described as having different parts or sections (140, 130, and 120). The Rx section 110 (also referred to as the Rx segment or monorail segment) is attached to the distal end of the catheter sheath 190 by known processes (e.g., welding, bonding, pressure fitting, etc.) with an angled joint 115 (proximal stub). In one example embodiment, the proximal stub of the Rx segment is inserted into the open distal end (first lumen LM1) of tubular sheath 190 and melt-bonded therein to form a monolithic structure with the tubular sheath. The angled joint 115 or proximal stub is an integral part of the Rx section 110.

The rapid exchange section 110 is configured to be mated with the catheter sheath 190 by pressure fitting the proximal part of the Rx section to the distal end of the sheath 190 (namely the window section 120). When the window section 120 of the catheter sheath 190 and the rapid exchange section 110 are mated together, the longitudinal axis A2 of the second lumen LM2 and the longitudinal axis A1 of the first lumen LM1 are laterally offset from each other by a distance ΔLM, and angled by an acute angle β. The distance ΔLM of the offset (offset distance) between axis A1 and axis A2 can be measured at the location where the tubular sheath 190 and the rapid exchange segment 110 are mated (at the angled joint 115). However, since the axis of the tubular sheath 190 and the axis of the rapid exchange segment 110 can become substantially parallel to each other with a minimal force, the offset distance between the axes of the first and second lumens can be measured at any point along the catheter when the two axes are parallel to each other.

The offset distance depends mainly on the diameter of the guidewire to be used with the catheter, and then on the diameter of the window section 120 and the angle of joint or proximal stub 115. According to at least one embodiment, given an exemplary coronary guidewire of 0.014 inch diameter and, for an exemplary catheter with a window profile of 0.031 inch diameter, the offset distance ΔLM between the first and second axis would be in a range of about 0.024 inches to 0.026 inches (about double the guidewire diameter) to provide sufficient clearance between the window section and the guidewire for frictionless navigation of the catheter on the guidewire. However, these exemplary dimensions are non-limiting. In general, the offset distance may also be defined in terms of the Rx segment length and its stiffness. According to the present disclosure, a minimum guidewire lumen length (the Rx segment length) is approximately 40 times the guidewire diameter. As discussed elsewhere throughout this disclosure, when the catheter is inserted into a lumen (a guide catheter or the patient's anatomy), the catheter sheath (190) and/or the rapid exchange segment 110 straighten out with respect to each other so that the axes of the two lumens operate substantially parallel to each other. Therefore, the offset distance between the first lumen and second lumen should be at least equivalent to the diameter of the guidewire lumen or the guidewire thickness. In terms of guidewire diameter, in at least one embodiment, the axis of the first lumen and the axis of the second lumen are offset from each other by an offset distance in a range of about half to twice (double) of the guidewire diameter. A minimum offset distance is advantageous in reducing the overall diameter of the catheter, while an increased offset distance is advantageous in providing sufficient clearance between the window section and the guidewire for frictionless navigation of the catheter on the guidewire.

In addition, according to at least one embodiment, the guidewire lumen (LM2) is angled with respect to the catheter sheath lumen (LM1) by about 1 to 3 degrees for thin guidewires, but in other embodiments the angle can be varied within a range of about 2 to 9 degrees medium size guidewires, or within a range of 3 to 15 degrees for thicker guidewires. In other words, the angle between the catheter sheath lumen (LM1) and the guidewire lumen (LM2) can have a range of about 1 to 15 degrees depending at least on the thickness (diameter) of the guidewire and the lengths of the Rx section 110 and/or the sheath 190.

FIG. 1B shows a cross-sectional view of the mid-shaft section 130 taken along line A-A, as seen on the x-y plane which is perpendicular to the z-axis. The mid-shaft section 130 of catheter sheath 190 comprises a hypotube body reinforced by a multi-layer polymeric structure. A hypotube is a long metallic tube with micro-engineered features formed by laser-cutting along its length. The mid-shaft section 130 is an important component of the catheter 100; it can be utilized in conjunction with other devices such as balloons, stents, or, according to at least one embodiment, particularly with the Rx section 110. According to one or more embodiments of the present disclosure, the mid-shaft section 130 is configured to enter a bodily anatomy and push the window section 120 through a long, tortuous and complicated path towards a location of interest (e.g., a clogged artery). For safe navigation through such tortuous paths, the mid-shaft section 120 must resist kinking without compromising its ability to easily glide through the anatomy. The main parameters to easily navigate the catheter 100 through a tortuous anatomy are known as pushability and trackability. To satisfy these parameters, the mid-shaft section 130 is comprised of a micro-engineered metal structure generally known as hypotube covered by several layers polymer material.

More specifically, as shown in FIG. 1B, a sectional view A-A of the catheter sheath 190 illustrates the mid-shaft section 130 is formed of several concentric layers comprising: a metal layer (hypotube body 134), an inner polymer layer 135, and outer polymer layer 137, and a protective or external surface layer 136. In addition, in at least some embodiments, a slippery layer is added to the external surface layer 136 to reduce frictional resistance within the vessel. The metal layer or hypotube body 134 has a cut 139 defining a helical slot. A cross-sectional view taken along the longitudinal direction of the main lumen (LM1) shows helical slot made by cut 139 in the hypotube body 134, which ends at the mid-shaft to window transition, see FIG. 3D. FIG. 3D also shows filler material 129 used to create a smooth taper between the two segments (window segment 120 and mid-shaft section 130).

Window extrusion extends the entire length, Outer jacket ends at this transition, with fillers at either end. Notably, according to the embodiment shown in FIG. 1A and FIG. 1B, the proximal portion 140, and the mid-shaft section 130 comprises a metallic tube (hypotube body 134) with a micro engineered laser cut which can be helical slot 139. The helical slot 139 has a varying pitch that changes from a first pitch P1 at the proximal portion 140 to a second pitch P2 at or near a distal end 131. The pitch P2 can vary a number of n-steps from pitch P1 to pitch P2 depending on the desired degrees of lateral rigidity and/or flexural stiffness. The helically slotted hypotube body 134 is sandwiched between multiple layers of polymer including at least a first polymer layer 135 on an inner surface of the hypotube body, a second polymer layer 137 an outer surface of the hypotube body, and a protective or external polymer layer 136. The polymer layers may include biocompatible polymers, such as PTFE or similar that can provide lubricity on the inner and outer surfaces of the catheter sheath. The hypotube body 134 may comprise biocompatible metals or metal alloys, such as nitinol (nickel titanium alloy), stainless steel, tantalum, gold, platinum, titanium, copper, nickel, vanadium, zinc metal alloys thereof, copper-zinc-aluminum alloy, and combinations thereof.

By using specific polymer materials in the covering layers, varying the pitch parameters of the helical slot 139 made in the hypotube and controlling the wall thickness of the mid-shaft section 130, the catheter 100 is particularly designed to be very stiff at proximal portion 140 and gradually less stiff towards the distal end 131 where the window section begins. More specifically, the stiffness of the mid-shaft section 130 tapers from a very high stiffness at the proximal portion 140 to a substantially lower stiffness at the distal end 131; i.e., the point where the sheath 190 transitions from the mid-shaft section 130 into the window section 120. According to one embodiment, the mid-shaft section 130 has a stiffness of about 4.7 milli-Newton-meters (mN-m) at the proximal portion 140, tapering to about 0.18 mN-m at the distal end 131. The distal end 131 is a part of the sheath where the mid-shaft section 130 transitions into the window section 120 to nearly match the stiffness of the window segment. This allows is a smooth stiffness transition between mid-shaft section 130 and imaging window section 120, and prevents kinking of the catheter.

<Rx Section 110>

The importance of optimized stiffness defined by appropriate wall-thickness to diameter ratios of the various segments of the catheter sheath cannot be overstated because, together with low-friction coatings they allow adequate pushability (column strength), crush and ovalization resistance (hoop strength), and ease of navigation in tortuous anatomies, while maintaining adequate lateral flexibility to conform to tortuous anatomy. Like the vessels the catheter navigates in and through, the catheter sheath tapers both in profile and stiffness to meet the needs of each segment.

Figure 2B:
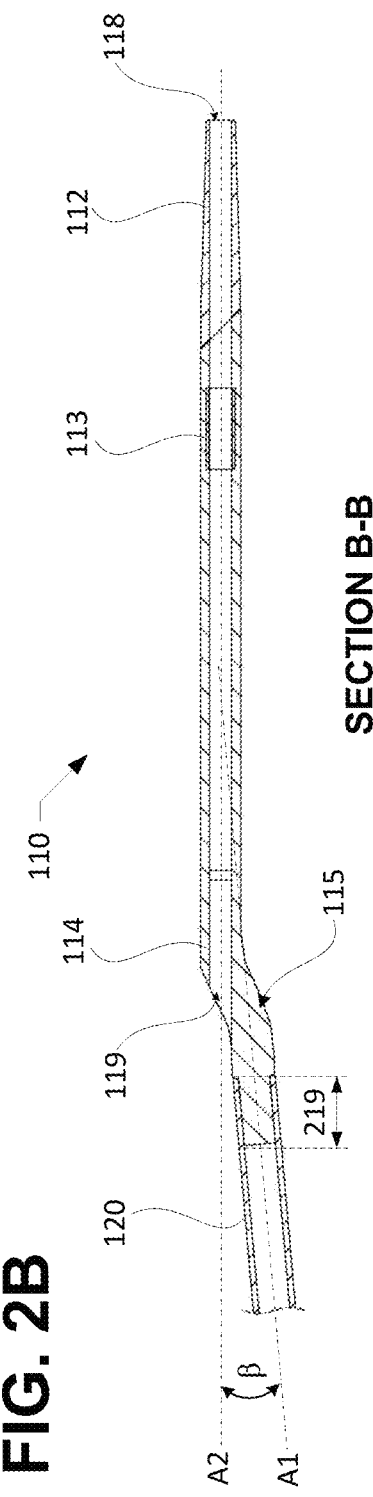

FIG. 2A shows a perspective view and FIG. 2B shows a cross-sectional view taken along the longitudinal direction (section B-B) of the rapid exchange (Rx) section 110 of catheter 100. Design attributes of Rx section 110 are described referring to FIG. 2A and FIG. 2B. As shown in FIG. 2B, the angled joint 115 (joint connection) is attached by, for example, bonding a predetermined length 219 of the proximal part 114 of the Rx section 110 to the distal end of the window section 120.

The rapid exchange section 110 is attached to the distal end of the window section 120 by the angled joint 115 which is made of the same material and preferably molded together with the Rx section 110. The angled joint 115 mates with a distal end of the window section 120, such that a proximal part 114 of the Rx section 110 overlaps at least a certain length 219 with the window section 120. The rapid exchange section 110 includes a guidewire entry port 118 at the distal end thereof, a guidewire exit port 119 at the proximal part 114, and an atraumatic distal tip 112 at the distal end. In addition, the rapid exchange section 110 includes one or more radiopaque marker bands 113. The radiopaque marker bands can be positioned just proximal to the soft distal tip 112, usually within 3 mm to 5 mm of the distal tip 112. These and other radiopaque (R-O) markers can be formed from slightly radioactive material, such as platinum with 10% iridium to enhance catheter visibility under fluoroscopy. R-O marker bands may also be formed out of pure gold, which has nearly the same fluoroscopic visibility as platinum-iridium due to its high density. The R-O marker bands 113 may take up a significant portion of the available wall thickness. Therefore, according to at least one embodiment, it is preferable to position the marker bands 113 within the stiffer, stronger material than the softer distal tip 112 to preserve needed tensile strength of the Rx section 110.

In one or more embodiments, the distal tip 112 of the Rx section 110 is a relatively soft and atraumatic. The distal tip 112 can be made from polymeric material having substantially lower stiffness than the remainder of the Rx segment shaft so as to prevent trauma of the patient's anatomy (e.g., the vessel walls or other tissue). The distal tip 112 has an outer diameter tapered in a direction from the proximal end to the distal end. To prevent trauma of the patient's anatomy, the distal tip 112 is smooth, soft, has no sharp edges and no flash. Flash is excess plastic or rubber material that forms on the surface of molder parts.

The exit port 119 in the proximal part 114 of the Rx section 110 must be formed without sharp edges, burrs or flash that could cause damage to sensitive anatomy or catch on stent struts as the catheter is being withdrawn from the anatomy. For this reason, in at least some embodiments, the proximal end of the guidewire lumen at the guidewire exit port 119 is reduced in diameter to reduce the chances of causing damage to lumen anatomy.

Desirable attributes for the rapid exchange section 110 that can help make the catheter more easily deliverable to a desired location are described first in terms of Flexural Modulus (flex modulus) of materials, and then in terms of stiffness parameters. Flexural modulus (or bending modulus) is computed as the ratio of stress to strain in flexural deformation (the tendency to resist bending) of a material, and it describes mainly the material properties without taking into account the form (shape or size) of a device. In contrast, stiffness depends on the size, diameter, wall thickness of the catheter device, plus the material flexural modulus and durometer values of the material making up the device. In the present application, the following attributes are particularly desirable for the Rx section 110, which is considered as a substantially cylindrical tubular shaft having an outer surface and inner surface defining a wall that encloses the guidewire lumen LM2.

(1) Minimized profile of all segment-surfaces that contact the anatomy of a patient's tissue (e.g., vessel wall). In that regard, for a specific application, the profile of the rapid exchange section 110 must have parameters compatible with such specific application (e.g., 6 Fr maximum diameter for coronary guide catheters and a guidewire lumen compatible with 0.014 inch guidewires).

(2) Most catheters are fitted with a soft distal tip to prevent damage to sensitive anatomy. However, according to the present disclosure, a soft and atraumatic distal tip 112 having hardness durometer of about 42 D Shore and Flexural Modulus of about 77 MPa is specifically designed taking into consideration the other sections of the catheter 100. An optimized distal-tip design provides an atraumatic distal tip 112 that will not damage sensitive and disrupted vessels, and will not catch on mal-opposed stent struts or damaged tissue due to its guidewire-hugging, tapered, and radiused distal soft-tip. This soft distal tip 112 is also important for navigation capabilities as it begins to augment the guidewire function, by guiding the catheter around tight bends without damaging the patient's anatomy.

(3) The Rx section 110 has a monolithic tubular shaft segment extending from the proximal part 114 (exchange body portion) to the distal tip 112 (atraumatic tip). The Rx section is integrally formed as a single monolithic member made of molded material having a hardness durometer of about 64 D Shore, and a Flexural Modulus about 285 MPa at the proximal part 114. These values gradually taper to a Flexural Modulus of about 77 MPa and hardness durometer about 42 D Shore at the distal tip 112. These values can allow the rapid exchange section 110 to easily conform to tortuosity, and to resist twisting while meeting tensile requirements.

According to one embodiment, the Rx segment 110 has a tubular body extending from the proximal part 114 to the distal tip 112 in which an outer diameter (OD) to wall-thickness ratio, as well as the flexural modulus is varied from the proximal part to the distal tip. For example, the Rx segment body has an OD of approximately 0.0300 inches, a wall-thickness of about 0.0070 inches, a flexural modulus of about 285 MPa, and a hardness durometer of about 64 D Shore. In addition, the outer diameter of the Rx segment may taper from about 0.0300 to about 0.0220 inches. In this regard, it is important to maintain the wall thickness of the Rx segment 110 within a certain ratio of outer diameter to wall-thickness. When the wall-thickness is too thin, a semi-rigid tubular shaft may easily kink. This should be avoided, in particular as disclosed herein, in a type of imaging catheter where the imaging core needs to rotate freely inside the catheter sheath.

The soft distal tip 112 may have an outer diameter (OD) that tapers from about 0.0300 inches to about 0.022 inches with a flexural modulus of about 77 MPa and a hardness] durometer of about 42 D Shore. The above data, Flex Mod and stiffness values are based on publicly available polymer product information such as technical data sheets, and actual test data obtained from testing done by Nordson Medical on a prototype catheter sheath and Rx segment designed by the present inventor(s).

(4) The Rx segment is made of softer material as compared to materials of the window segment 120 (i.e., the material of most distal section or Rx segment 110 has lower durometer and flex modulus values than the materials of window section 120). This property keeps the rapid exchange section 110 from being too rigid (e.g., due to a thicker wall at the Rx segment) so the window section 120 does not kink near the Rx segment 110.

(5) Offset Centerlines of the Rx segment and Imaging Window section. Centerlines (longitudinal axis A1 and Axis A2, respectively) of Rx section 110 and of window section 120 are offset from each other so that the guidewire 300 can slide into the guidewire entry port 118, travel through the guidewire lumen LM2, and pass through the exit port 119 without interference from the window section 120. In addition, the Rx section 110 is also angled at an angle β of approximately 5 degrees (°) with respect to the window section 120. Arranging the Rx section 110 at a small angle with respect to the sheath 190 allows the guidewire to easily advance through the exit port 119 without interference from the window section 120. In addition, arranging the Rx section 110 at an angle with respect to the sheath 190 can facilitate construction methods while minimizing the overall profile of the catheter as a whole. More specifically, the longitudinal axis A1 of the Rx section 110 is arranged at an angle β with respect to the longitudinal axis A2 of the catheter sheath section 190, as shown in FIG. 2B. The angle is provided by the angled joint 115. In contrast, in conventional catheters, the Rx segment is typically arranged collinear or parallel with the working lumen of the catheter sheath. See, for example, publications US 2011/0144581, US 2018/0214120, US 2014/0309533, US 2014/0180076, US 2012/0303054, among others. In the present disclosure, the angle β helps in the molding, and in assembling of the molded Rx segment component, and it also reduces the chances that the guidewire is held against the catheter sheath as it exits the guidewire lumen.

(6) The Rx segment 110 has one or more than one radiopaque (R-O) marker bands 113 embedded in the Rx segment material. In certain embodiments, the R-O marker bans can be formed at a predetermined distance from the distal tip 112. In other embodiments, the R-O marker band can also be formed in the distal tip 112. The radiopaque marker band 113 shows the user where the catheter distal tip 112 is located via fluoroscopy. Embedding the radiopaque marker band 113 in the distal tip material provides high visibility under image guidance, while keeping an overall low profile. Additional radiopaque marker bands can be added on proximal part 114 of the Rx section 110, on the window section 120, and/or on the imaging core 200.

(7) Injection Molded fabrication. The rapid exchange section 110 can be fabricated by known extrusion methods, and/or preferably by injection molding. An injection molded Rx section 110 provides a consistent guidewire lumen LM2 with a guidewire entry port 118 and exit port 119 with minimal variations. This allows for minimal post-manufacturing operations to clean up, without having to remove flash or skive (remove) remaining material. Therefore, injection molded fabrication allows to keep manufacturing costs down, and helps maintain device accuracy high and variability low, which is important for tensile strength specifications and also to minimize the likelihood of kinking at the guidewire exit port.

Radio-opacity and Marker Bands. Various radio-opaque fillers and additives are known and available to catheter designers. However, some of these well-known radiopaque materials tend to modify the material properties of the catheter sheath. Therefore, some radio-opaque filled sheath materials may not produce as high contrast (radio-opacity) via fluoroscopy imaging. Accordingly, careful consideration should be taken in determining the type of radiopaque material used for the Rx section 110. In general, marker bands made of platinum-iridium and/or gold, which tend to yield the best radio-opacity for a given wall thickness, are commonly used at the distal end of the sheath to show the clinician where the tip is located with respect to the anatomy.

According to other embodiments, the one or more radiopaque bands 113 may include known radiopaque metals or their alloys incorporated into the profile of the Rx section structure body. For example, radiopaque powders or compounds such as Barium sulfate (BaSO), Barium chlorate (BiCO), Bismuth Subcarbonate (Bi2O2CO3), Bismuth Oxychloride (BiOCl), Bismuth Trioxide (Bi2O3), and the like can be incorporated into the polymer forming the structure of Rx section 110 or the distal tip 112. Other radiopaque materials and process conditions to produce a medical device, such as a catheter, exhibiting high radiopaque and optically transparent properties are known to persons of ordinary skill in the art from, for example, publication US 201/0264080, which is incorporated by reference in its entirety. The material for radiopaque band 113 is not limited to any specific composition or alloy, as long as it allows for easy visualization of the Rx section 110 of catheter 100 under image guided interventions, such as fluoroscopy guided Percutaneous Transluminal Coronary Angioplasty (PTCA).

FIG. 3A shows another embodiment of the catheter 100 which includes an imaging core 200 arranged in the window section 120. FIG. 3B shows an angled joint 115 which illustrates an attachment of the Rx section 110 to the distal end of the catheter sheath 190. FIG. 3C shows additional details of the Rx section 110, the guidewire lumen LM2, and tapering details of the inner diameter (ID) and outer diameter (OD) of the Rx segment 110.

With reference to FIG. 3A, the Rx section 110, sometimes also referred to as the monorail segment or the Rx segment is the most distal portion of the catheter too which rides substantially concentric on the guidewire 300 (shown in FIGS. 4A-4C, and 7B). The Rx section 110 plays a key role in navigating the catheter 100 through tortuous anatomies because it leads the rest of the catheter shaft along the guidewire. The Rx section 110 must advance through tortuous anatomies to the site of interest without kinking, without catching on stent struts or on damaged vessel wall structures, or otherwise resulting in damage to the patient's anatomy or the device itself. The Rx section 110 is significantly shorter than the catheter sheath 190. However, the Rx section 110 employs multiple durometer values and/or materials even within its short length. The following details are relevant to the design of the Rx section 110.

First, as previously mentioned, the material for the Rx section 110 is softer than the material of the nearest proximal segment. In most embodiments of catheter too, the nearest proximal segment is the window section 120; i.e., the section of the sheath 190 which houses the imaging core 200 and includes a window transparent to the radiation of imaging core 200.

One important aspect of the Rx section 110 is that the distal tip 112 is fitted with a tapered, rounded, atraumatic tip that has no flash surface. According to at least one embodiment, the distal tip 112 has an opening or entry port 118 which is designed to hug the guidewire at the tip only to prevent the guidewire lumen from catching exposed stent struts, calcified plaque or other artifacts within the patient's anatomy. According to another embodiment, the exit port 119 is designed to prevent the guidewire lumen from catching exposed stent struts, calcified plaque or other artifacts within the anatomy, as the catheter is withdrawn from the patient. In alternate embodiments, both the entry port 118 and distal port 119 of the Rx section 110 can be optimized for specific guidewire diameters, such that the diameter of the guidewire lumen is the same at both ends and it does not catch exposed stent struts, calcified plaque or other artifacts within the anatomy. In further embodiments, the guidewire lumen LM2 of the Rx section 110 is tapered at both ends to hug the guidewire at the entry port 118 and at the exit port 119 so that the catheter does not have any chance to catch on stent struts and/or sensitive anatomy as stated above. On the outer surface, the entire Rx section 110 is smooth and tapered, without raised edges or features that might catch on sensitive anatomy or otherwise cause complications within vasculature.

As shown in FIG. 3C, in one example embodiment, the guidewire lumen (LM2) is inversely tapered from the distal tip 112 to the proximal part 114 to reduce the chances that the guidewire exit port 119 would catch on exposed or protruding stent struts. More specifically, the lumen LM2 of the Rx section 110 has an inner diameter (ID1) at the proximal part 114 which is smaller than the inner diameter (ID2) at the distal tip 112. That is, in the Rx section 110, the inner diameter (ID2) of the lumen LM2 at the distal end thereof is larger than the inner diameter (ID1) at the proximal part of the Rx section 110, i.e., ID2>ID1.

On the other hand, the outer diameter (OD) of the Rx section 110 is tapered in a direction from the proximal part 114 to the distal end thereof. Specifically, as shown in FIG. 3C, the Rx section 110 starts at the proximal part 114 with a first outer diameter (OD1), and near the distal tip 112, the Rx section 110 has a second outer diameter (OD2) which is smaller than the OD1. That is, in the Rx section 110, the outer diameter is tapered from the proximal end to the distal end, i.e., OD1>OD2.

Furthermore, the guidewire lumen LM2 is offset at least at one end of the Rx section 110. Specifically, as shown in FIG. 3C, at the distal tip 112, the guidewire lumen LM2 is centered (or coaxial) with the outer diameter. In other words, ID2 is concentric with OD2. On the other hand, at the proximal part 114, the guide wire lumen LM2 is not centered (not coaxial) with the outer diameter thereof. That is, ID1 in not concentric with OD1. This particular design allows for arranging the Rx section 110 at an angle with respect to the catheter sheath 190, while still maintaining a minimum overall profile of the catheter too.

FIG. 3B shows an angled joint 115 illustrating an example of how the Rx section 110 is mated with the distal end of the catheter sheath 190 (namely to the window section 120). As shown in FIG. 3B, the distal end of catheter sheath 190, that is, the window section 120, has a side-view window 217 and an inner space 210 to house inside the first lumen LM1 and imaging core 200. On the other hand, the Rx section 110 is monolithically formed with an angled feature which connects with the distal end of the sheath.

Specifically, at the proximal end (proximal part 114) of the Rx segment 110, a junction feature (angled joint 115) is provided to facilitate attachment of the Rx segment to the distal segment of the sheath. In the case of FIG. 3A, the imaging window section 120 must be attached to the Rx section 110 with adequate tensile and flexural strength to ensure safe operation within coronary vessels or other desired anatomy. Examples of other locations within the body include, but are not limited to, neural vasculature, gastro intestinal (GI) and urinary tracts. The attachment joint 115 serves to establish an angle β between the axis A1 of the first lumen LM1 and the axis A2 of the second lumen LM2. That is, the attachment joint 115 extends the axis A1 of the catheter sheath 190 angled from the axis A2 of the Rx segment to facilitate reliable and repeatable strong attachment via glue, melt-bond or other means. This angle β tends to position the Rx segment axis A2 at a slight angle from the sheath axis A1 to facilitate ease of manufacture and/or assembly, but since these materials are flexible, this angle between sheath and Rx section straightens out in use due to the constraint within the guidewire lumen and/or anatomical lumens. In this manner, when the Rx segment 110 is attached to the catheter sheath 190, and the catheter 100 is navigated through an anatomical lumen, the axis A2 of the Rx segment and the axis A1 of the catheter sheath can become substantially parallel, while remaining laterally offset from each other.

Both components (catheter sheath 190 and Rx segment 110) are made of like materials, so they are melt-bonded together with heat, via a 'post' on the molded tip that is inserted into the window segment ID (see FIGS. 2B & 4A), with a slight interference fit to ease assembly, typically using mandrels and heat shrinkable tubing.

FIG. 4A through FIG. 4C show details and advantages of the Rx section 110, as catheter 100 is advanced distally over a guidewire 300. FIG. 4A shows an exemplary embodiment of the Rx section 110 with a guidewire 300 inserted along the guidewire lumen LM2. FIG. 4B and FIG. 4C show details of the guidewire and catheter interaction as the catheter 100 is advanced distally over the guidewire 300. In FIG. 4C, as the catheter advances distally in distal direction 102, the guidewire 300 enters through the entry port 118 in a proximal direction of arrow 302. In FIG. 4C, as the catheter advances in the distal direction 102-101, the guide wire exits from the Rx segment 110 through the exit port 119 in a direction of arrow 302. Since the axis A1 of the main lumen (LM1) and the axis A2 of the guidewire lumen (LM2) are offset and angled with respect to each other, guide wire 300 exits through the exit port 119 without any interference or resistance from the window section 120, and the catheter is advanced distally over guidewire unobstructed.

As disclosed herein the rapid exchange section 110 rides on the guidewire 300 like a monorail to guide the catheter 100 to a site of interest. The guidewire 300 must slide freely in both directions, even in tortuosity. To improve such movement, the catheter 100 has a minimized profile of all segments that contact the anatomy. For example, as discussed above, the distal tip 112 has very soft atraumatic tip that hugs the guidewire and prevents the guidewire lumen LM2 from caching on stent struts or damaged vessel walls. Then, the Rx segment 110 is made of molded material having a lower hardness durometer and Flexural Modulus than the nearest proximal part (i.e., the window section). The centerlines of the Rx segment 110 and of adjacent proximal sheath segment are offset and angled with respect to each other to allow the guidewire 300 to slide freely. The radiopaque marker band 113 is embedded within the wall of the Rx section 110 to keep distal profile low. The Rx segment 110 is injection molded to the exact shape and dimensions to align and engage with the distal end of the catheter sheath 190 (i.e., with the window section 120). This requires minimal post-operations such as skiving, burr, flash removal and/or reflow operations.

As particularly shown in FIG. 4C, the distal tip 112 is tapered in the direction from the proximal to the distal end. The entry port 118 of the guidewire lumen LM2 has an inner diameter ID2 which is equal to the diameter of the guidewire 300. On the other hand, the exit port 119 of the guidewire lumen LM2 has an inner diameter ID1 which is slightly larger than the diameter of the guidewire 300. As shown in FIG. 4B, the guidewire 300 advances along the longitudinal axis A2 of the guidewire lumen LM2. In this manner, since the longitudinal axis A2 is at an angle with respect to the longitudinal axis A1, the guidewire 300 is free to advance in the direction of arrow 300 without any interference form the window section 120.

According to one embodiment, the somewhat stiffer body of the Rx section 110 (hardness durometer approximately 63 D Shore) slides easily over the guidewire 300 due to adequate clearance and lubrication between guidewire diameter and the inner surface of Rx segment lumen LM2, in particular at the exit port 119. The guidewire 300 is expected to be coated with low-friction material to minimize frictional resistance between Rx segment and guidewire. In addition, the Rx segment material can be modified to reduce friction by the addition of a lubricious additive, e.g., EverGlide® MED available from Polymer Dynamix of New Jersey. This friction reducing additive acts to reduce frictional resistance between catheter guidewire lumen LM2 and guidewire 300. Even though the guidewire 300 may already be coated with a hydrophilic coating, it is also advantageous to add a lubricious additive to the guidewire lumen LM2 to allow the guidewire 300 to slide freely without excess frictional resistance. The lubricious additive is particularly relevant where, as in the present disclosure, the entry port 118, the inner diameter of the guidewire lumen LM2, and the exit port 119 are optimized so that the guidewire 300 does not catch disrupted vessels or mal-opposed stent struts.

<Window Section 120>

For imaging catheters, the window extrusion itself contributes most of the overall stiffness or rigidity of the catheter near the distal end of the catheter sheath 190. In addition, some stiffness comes from the rotating imaging core which is disposed inside the sheath. The imaging core is comprised of a drive cable, one or more optical fibers, a distal optics assembly, and other components configured to allow the imaging core to rotate and/or translate within the catheter sheath with minimal friction. The entire assembly rotates within the sheath. In catheters that employ a rotating imaging core 200, such as the imaging catheter shown in FIG. 3A, the design and assembly tolerances dictate that there should be a gap between the tip of the imaging core 200 and the distal end of the window section 120. This creates an unsupported area 220 in the distal end of window section 120 (see FIG. 3B and FIG. 3C). The area 220 is the unsupported area because the imaging core does not provide support for the wall of the sheath. Therefore this part of the sheath is softer, and can be more susceptible to kink. Even if the unsupported area 220 is not long, it has significantly lower lateral rigidity than the portion of the window section that includes the imaging core and/or the proximal part 114 of the Rx segment 110 that is distally adjacent to the unsupported area 220 of the window section. Under strenuous operating conditions, e.g., when navigating through tortuous paths while imaging and/or performing push forward or pullback operations of the imaging core, the unsupported area 220 could introduce a "hinging" effect where the sheath tends to kink and hinge, leading to serious navigation challenges and possible imaging deficiencies.

Therefore, at the proximal end of the Rx section 110, an attachment feature in the form of the angled joint or proximal stub 115 is provided to facilitate attachment to the distal end of the sheath 190. This joint attachment feature, in the form of the angled joint or stub 115, allows the window section 120 be easily attached and correctly aligned to the Rx section 110 with adequate tensile and flexural strength to ensure safe operation within coronary or other desired anatomies. An aspect ratio of bending (lateral) stiffness to torsional stiffness of the imaging core arranged in the window section is maintained at or near 0.025. Examples of locations within a patient's body where the attachment feature is advantageous include without limitation neural vasculature, GI and urinary tracts, among others. The attachment feature axis is angled from the axis of the Rx and sheath sections to facilitate reliable and repeatable strong attachment by the use of glue, melt-bond, ultrasonic weld or other similar procedures. This angled joint or stub 115 tends to position the Rx segment axis A2 at a slight angle from the sheath axis A1 to facilitate ease of manufacture (assembly), but since these materials are flexible, the angle between the two attached components straightens out during use due to the constraint within the guide catheter lumen and/or anatomical lumens.

In addition, it is important to minimize the length of the unsupported area 220, while still providing sufficient space for the imaging core 200. Since the distal end of the window section 120 and the proximal part 114 of the Rx section 110 must form a solid joint, it is necessary to allow a small space in the window portion 120 not containing the first lumen (LM1) to overlap with the proximal part 114 of the Rx section 110. However, the length 219 of the window portion 120 not containing the first lumen (LM1) is minimized to prevent kinking of the catheter.

Providing an unsupported area 220 of a minimized length at the distal end of the window section 120 can be accomplished in a variety of ways, one of which is to set the length of the sheath section at final assembly based on the imaging core length, comparing lengths and cutting off the proximal end of the sheath at final assembly to match the imaging core length and minimize the unsupported gap. At the same time, there is a need to provide sufficient support for securely mating and aligning the distal end of the sheath 190 to the proximal part 114 of the Rx section 110. Therefore, there will remain a small gap (unsupported area 220) at the distal end of imaging window 120 because the imaging core 200 is pulled back approximately 1.5 mm during system self-calibration and device "homing" at the start of an imaging procedure.

Desirable attributes of the imaging window section 120 and distal shaft segment structure that help make the catheter more deliverable and produce excellent images are described next. Here too, the parameters are first described in terms of Flexural Modulus of materials, and then via stiffness parameters. Other material properties specific to the window section 120 are the refractive index and/or acoustic impedance of the window materials, which are selected according to the specific imaging modality.

The distal part of the window section 120 and window material require very tight window wall-thickness tolerance and concentricity specifications because catheters with imaging systems require on-site calibration (e.g., z-calibration) to ensure accurate on-screen measurements. These measurements are important to clinicians because they rely on such measurements to make medical diagnoses and determine appropriate stent sizes, balloon diameters, etc. Therefore, concentricity and wall-thickness needs to be carefully balanced. In particular, when larger diameter lumens are needed in a catheter, wall-thickness and concentricity need to be tailored based on the flexural modulus and durometer values so the catheter sheath resists kinking.

In imaging catheters, the window segment is configured to provide a compromise between adequate pushability (column strength) and relatively softer lateral stiffness based on the outer diameter (OD), wall thickness, durometer, and material flex modulus to allow excellent navigation performance within the coronary anatomy. Again, a low friction coating on the surface of the window segment would substantially eliminate frictional resistance between the catheter and the anatomy so that the catheter slides easily, and can easily navigate through tortuous anatomies to the site of interest without damaging delicate or disrupted coronary blood vessels or the catheter itself. These coatings can be either hydrophilic or hydrophobic, but hydrophilic are the most common, and also have the lowest friction coefficient available.

In imaging catheters, the distal part of imaging window section 120 should be optimized to efficiently pass light (for an OCT catheter) or sound (for an IVUS catheter), depending on the imaging modality, to facilitate optimal imaging of vessel walls. The resultant catheter can more accurately diagnose a local disease state to treat cardiovascular disease. Important for proper imaging through the window section 120 is acoustic impedance (Z) and/or the refractive index (n) of the window material, for IVUS and optical imaging catheters, respectively.

Therefore, according to at least one embodiment of the present disclosure, the window section 120 with a hardness durometer of about 72 D Shore, a flexural modulus of about 513 MPa, and bending stiffness of about 0.06-0.09 mN-m (milli Newton-meter) is considered advantageous. The bending stiffness of the window section 120 can preferably be in a range of about 0.07-0.08 mN-m to provide improved column strength combined with natural lubricity via high durometer and slippery additives for enhanced pushability and imaging core movement. The window section 120 combines catheter features soft enough in lateral rigidity to navigate through tortuous coronary vasculature without damage, yet stiff enough in column strength for excellent pushability. In one particular embodiment, the window section has a wall-thickness of about 0.0040 inches and an outer diameter (OD) of about 0.0310 inches, a flexural modulus of about 500 MPa, a hardness durometer of about 72 D Shore, and a lateral stiffness of about 0.075 mN-m.

FIG. 5 shows exemplary data for an Imaging Window section 120 of a multi-modality optical coherence tomography (OCT) imaging catheter. Lateral stiffness values of various segments of the sheath were measured during prototyping to ensure that each section meets a required specification. Stiffness values of the window segment 120, shown in FIG. 5 are important to provide adequate column strength for pushability, while ensuring that the distal window segment is flexible enough laterally to conform to coronary anatomy without damaging said anatomy.

In the Distal Shaft/Window Section interface, the wall-thickness to inner diameter (ID) ratio combine with material properties to create a kink resistant window that resists ovalization and crushing that could pinch the rotating imaging core causing excessive NURD. Wall-thickness to inner diameter ratio of the window section should be in a range of about 0.150 to 0.20, or preferably about 0.174, to minimize kinking in the window section of the catheter. It should be noted that, during use, the portion of the catheter where the window section joins the Rx segment (joint 115) can have substantial contact with anatomy due to tortuosity. Therefore, any possibility of kinking at the joint should be minimized. In addition, it is important that the unsupported area of the window section does not ovalize and maintains a concentricity >84%. The "Wall Thickness/ID ratio" can be obtained by simple arithmetic operations. For example, according to at least one embodiment, for a window having an inner diameter ID=0.023 inches and a window wall-thickness WWT=0.004 inches, the WWT/ID Ratio=0.004/0.023=0.174.

In the present disclosure, when describing various dimensions and ranges thereof, the values are given as "approximately" or "about" in order to allow for manufacturing and assembling tolerances. In that regard, approximately means +/−10% (e.g., approximately 0.0310 inches is between 0.0341 and 0.0279 inches), or +/−5% (e.g., approximately 0.0310 inches is between 0.0326 and 0.0294 inches).

Imaging catheters preferably utilize materials that facilitate artifact-free imaging, and that have optimized properties, such as optimized acoustic impedance for IVUS catheters, or optimized refractive index and low fluorescence for OCT catheters. For OCT catheters, window materials of refractive index matched with that of blood is preferable. Also important is the ability of the window material to efficiently transmit visible and infrared light through the window. For IVUS imaging catheters, window materials with appropriate acoustic impedance are preferable. For fluorescence-detecting catheters, a window section made of low native fluorescence materials is preferable.

Minimal Un-Supported Length at distal end of window (dead space beyond the imaging core, where window is more likely to kink) is preferable. Minimal dead space while providing enough room for the imaging core is important because (1) the distal end of the sheath (part of the window section) is no longer supported by the presence of the imaging core, and (2) the sheath no longer has the additional stiffness provided by imaging core and the window stiffness. Therefore, the section of the sheath after the imaging core and before the proximal part 114 of the Rx section 110 is more likely to kink. To avoid kinking between the distal end of the sheath 190 and the Rx section 110, a minimized length 219 is allowed in the angled joint 115.

The distal portion (~50 cm) of the catheter sheath is coated with a low-friction coating material that minimizes frictional resistance between the catheter and the guide catheter, and also the patient's anatomy. Here, the "distal portion", is a little longer than the window section alone; it's the portion of the sheath that may contact the anatomy (beyond the guide catheter).

The materials for imaging window section 120 and for the Rx segment 110 may include additional friction-reducing material additive(s) that reduces friction between the rotatable imaging core or obturator and the sheath ID to facilitate accurate imaging and ease of core motion through the sheath. EverGlide® or the like can be used in concentrations of up to 8%. Here, concentration refers percentage of a friction-reducing additive (e.g., EverGlide) to PEBAX.

Preferred sheath materials are carefully chosen to be compatible with human body internal temperature so as to not be significantly affected by body temperature. This ensures that catheter properties do not change within the anatomy.

<Imaging Core 200>

FIG. 6 illustrates an exemplary embodiment of an imaging core 200 configured to be arranged inside the first lumen (LM1) of catheter 100. According to one embodiment, a multimodality OCT (MMOCT) catheter 100 may include a rotating imaging core 200 arranged inside the catheter sheath 190 at the distal end thereof (i.e., namely in the window section 120). FIG. 6 shows part of the mid-shaft section 130 and part of the window section 120. The mid-shaft section 130 is shown with a metallic hypotube body 134 and slot cut 139 sandwiched between polymer layers. On the other hand, the window section 120 is shown without the hypotube 134 and made of a material transparent to radiation 625.

Figure 7B:
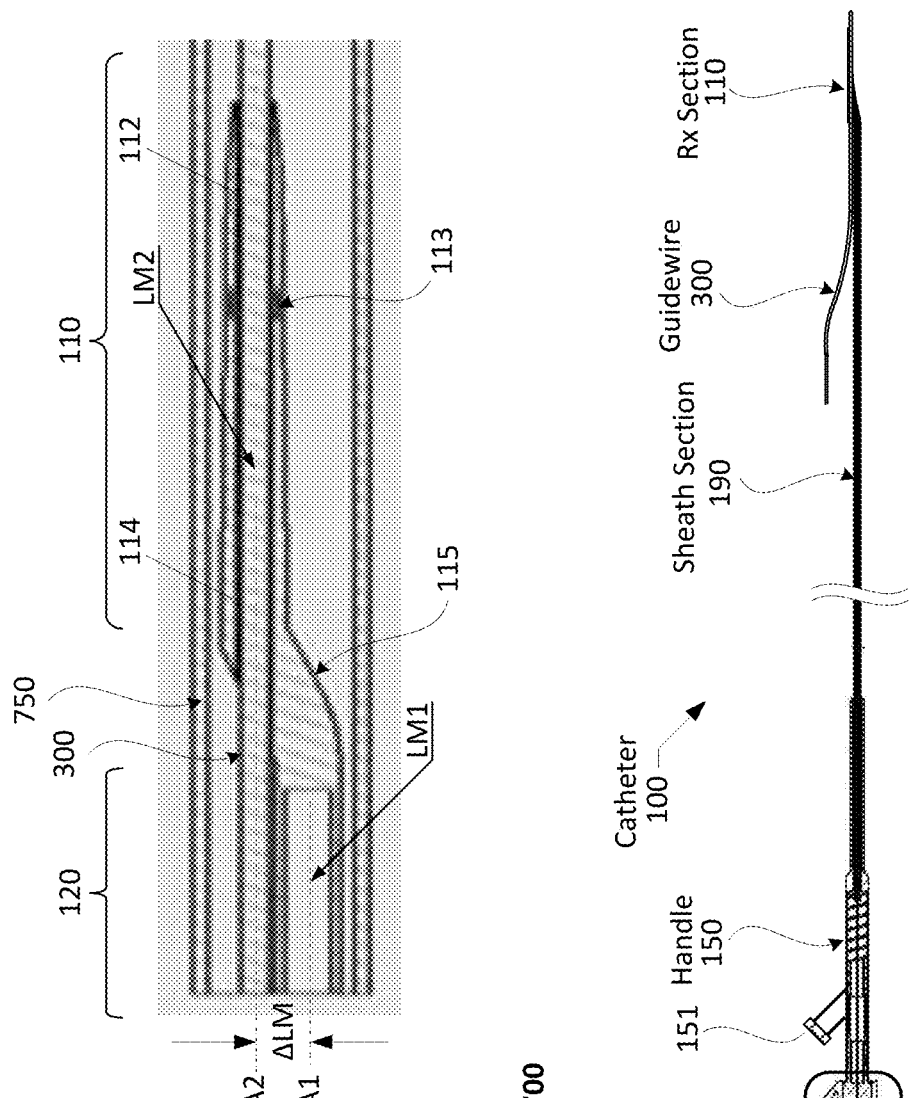
FIG. 7B illustrates an example embodiment of the Rx Segment in use within a lumen.
Figure 7A:
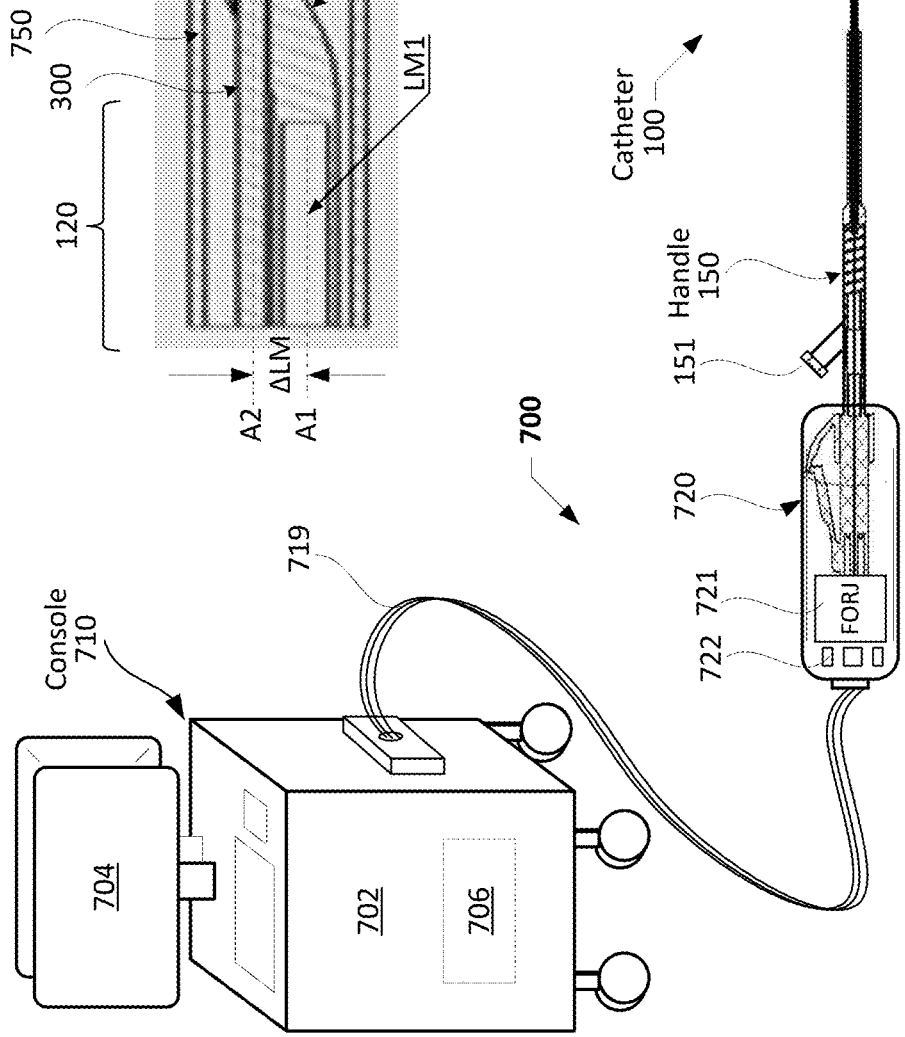
FIG. 7A illustrates an exemplary imaging system 700 in which the catheter 100, according to the present disclosure may be practiced.

The catheter 100 is coupled at the proximal end thereof with a patient interface unit (PIU) 720 (as shown in FIG. 7A). The imaging core 200 includes a drive cable 602 which extends from the proximal end to the distal end of catheter sheath 190. The drive cable 602 is configured to rotate or oscillate the imaging core 200 in a direction R about a longitudinal axis Ox. In addition, the drive cable 602 may also be configured to translate (longitudinally move) the imaging core 200 parallel to the axis Ox either in a forward or backward direction. In this manner, the imaging core 200 can scan a target sample 600 (e.g., bodily lumen such as a vessel) in a helicoidal pattern. The torque to rotate and/or the linear force to translate the drive cable 602 is delivered by a proximal motor of a fiber optic rotary joint (FORJ) and a linear actuator located within the PIU 720. To facilitate rotation and or translation movement of the imaging core inside the window section 120, a minimum clearance 613 is maintained between the imaging core and the inner diameter of the window section 120. Since the imaging core is sized within a minimum clearance, the imaging core reinforces the window section lateral rigidity or flexural stiffness, so that the catheter sheath will track better more consistently, have less variation (e.g., in ovalization), yield less NURD, etc., and ultimately cost less.

Arranged inside the drive cable 602 and fixedly secured thereto are an optical fiber 604 and a distal optics assembly 610. At the distal end of the catheter shaft 190, the optical fiber 604 is connected to a focusing element 612 such as a GRIN lens or a ball lens, a transparent spacer 614 which includes one or more reflective surfaces, and a dispersive element 616 such as a prism. The optical fiber 604 and distal optics assembly 610 can be referred as an imaging probe, which serves to transmit (and collect) electromagnetic radiation 625 to/from the target sample 600. The fiber 604 can be a single mode fiber (SMF) or a double-clad fiber (DCF). Electromagnetic radiation 625 may include light of one or more wavelengths transmitted through the fiber 604 and focused by the distal optics 610 on the target sample 600 located at working distance from the distal end of the optical probe. Electromagnetic 625 may also include reflected and/or scattered light with is collected by the same distal optics 610 and is delivered to a detection system (not shown) through the fiber 604 in the opposite direction.

In order to provide identifying location of a patient's surgical site and/or to provide positioning information of the catheter 100 with respect to the patient's anatomy, the window section 120 may include a plurality of radiopaque markers arranged within the structure of the imaging core 200. The radiopaque markers may include a first marker 620 arranged to denote an approximate location of the imaging plane, and a second marker 621 arranged near the distal tip of the Rx segment, for example, to show the clinician where the distal tip of the catheter resides. The first marker 620 is built-in within the outer diameter (OD) of a tube or metal can 615 which protects the distal optics assembly 610 (that is, the metal can 615 is a housing for the distal optics assembly). The marker 113 is positioned near the distal tip of the Rx segment, and is encapsulated within the wall of the monorail segment. An atraumatic bullnose tip 609 is arranged on (attached to) the distal end of the metal tube or can 615. The atraumatic tip 609 can also be made of radiopaque material and can be used as an additional marker.

<Mid-Shaft Section 130>

The configuration of the mid-shaft section 130 is carefully designed to make the catheter 100 more easily deliverable to a desired location. The parameters for the mid-shaft section 130 are described, first in terms of Flexural Modulus of exemplary materials, and then also via stiffness characteristics of the catheter structure. As mentioned earlier, the flex modulus only describes material properties, whereas sheath stiffness also depends largely on the size, diameter, wall thickness, plus material flexural modulus and durometer values of the actual catheter structure.

The mid-shaft section 130 has high stiffness at the proximal portion 140 which tapers to a lower stiffness at the distal end of the window section 120. This property affords excellent pushability and kink resistance, and gives the user confidence that he or she will not damage the catheter during manipulation and navigation to the site of interest (e.g., within coronary anatomy). Tapered stiffness along the length of the mid-shaft segment includes high rigidity in lateral stiffness at the proximal portion, tapering to very low lateral stiffness at the distal end.

The mid-shaft section 130 has composite construction which provides the necessary tapered stiffness. Specifically, the mid-shaft section 130 comprises a helically slotted hypotube body with helical slot 139 of varying pitch (P). The helical slot 139 has the largest pitch at or near the proximal portion 140 and the smallest pitch at or near the distal end 131 (i.e., at the point where the mid-shaft section 130 transitions to the window section 120). The hypotube body is sandwiched between layers of polymer, as shown and described with respect to FIG. 1B.

The varying pitch of the helical slot 139 provides for a very stiff structure at or near the proximal end, and a more compliant structure at or near the distal end 131 of the mid-shaft section 130. According to one embodiment, the mid-shaft section 130 has a stiffness of about 4.7 mN-m at or near the proximal portion 140, tapering to a stiffness of about 0.18 mN-m at the distal point 131. However, these values are only one example. In general, it desirable that the stiffness of mid-shaft section 130 at or near the distal end 131 nearly matches the stiffness of the window segment 120 so there is a smooth stiffness transition between mid-shaft section 130 and imaging window section 120.

The mid-shaft section 130 also has a larger profile than the window section 120. As a result, the variable stiffness of the mid-shaft section 130 yields excellent pushability due to increased column strength at proximal end. The mid-shaft section 130 has a gradually tapering stiffness to match the window stiffness for a smooth stiffness transition. Higher stiffness at or near the proximal end of the catheter sheath and seamless transition between the mid-shaft section to the window section provides the user with higher confidence that the catheter will not kink. Mid-shaft section construction also provides additional crush resistance so that the imaging core 200 can rotate freely without or with minimal NRUD, as described later in greater detail.

Lateral (bending) Stiffness of mid-shaft section 130: various segments of the catheter sheath stiffness are specifically tailored for optimal coronary catheterization through size 5 Fr or 6 Fr guide catheters using 0.014 inch diameter guidewires in the Rx section. During a procedure, the window section 120 contacts coronary vessels, and therefore needs to have adequate stiffness tailored to provide sufficient column strength for good pushability. However, at the same time, the window section 120 must be soft enough in lateral rigidity to not damage delicate coronary vasculature. These requirements are achieved by matching the variable stiffness of mid-shaft section 130 to that of window section 120. Specifically, the helically-slotted hypotube layer of the mid-shaft section 130 is designed with a helical slot 139 that provides increased crush resistance and variable stiffness by varying the pitch of the helical slot 139 from the proximal end to the distal end along the majority of the hypotube length.

The slot cut 139 of the hypotube body is not limited to a continuous helical cut. The cut pattern of the hypotube body may vary depending on the medical procedure, for example. In that regard, the cut pattern may vary as a function of the size of the medical device, the location of the anatomy of a patient, and the length of the catheter required to reach the target location from the insertion point. For example, instead of forming a continuous helical cut, the slot cut 139 may include multiple intermittent spiral cuts following a continuous helical path. In addition, in certain embodiments, the shape of the cut, the orientation of the cut, the size of the cut, etc., can be varied, so that a desired stiffness profile may be achieved. Further in addition, the density of cuts per unit length may be alternately increased and decreased to provide the desired flexibility to catheter shaft.

Similarly, the materials used to construct the mid-shaft section 130 may depend on the desired flexibility and pushability parameters of the catheter, and the application or medical procedure thereof. In one or more embodiments, the hypotube body may be constructed of a known material such as, stainless steel, cobalt chrome, nitinol, or other similar metals or metallic compounds. In certain embodiments, the hypotube body may be formed of separate parts, where each part may be made of a different metal or a metal alloy. Some known examples of metals and metal alloys suitable for a flexible catheter body include, but are not limited to, stainless steel, tungsten, nitinol; nickel-chromium alloy; nickel-chromium-iron alloy; cobalt alloy; tungsten alloys; copper beryllium, silver-plated-copper, and others.

Details of the varying pitch of slot 139 and advantageous effects thereof. Longer pitch=more crush resistance due to longer segments of hypotube that resist crushing. The actual dimensions of the slot cut 139 and pitch parameters are not specifically defined here because these parameters can change according to specific applications, as it would be understood to those skilled in the art. Nevertheless, it is noted that there are at least two different pitch segments that can provide certain variable lateral stiffness.

According to one example, Table 1 summarizes Taber stiffness data for various examples of a mid-shaft section 130. Taber is a stiffness testing machine and/or method that measures the stiffness of a specimen by determining the bending moment in millinewton-millimeter (mN-m) required to deflect the free end of a clamped specimen by a predetermined amount of degrees. In Table 1, N=15 is the number of samples tested. Table 1 tabulates Min, Max, and mean values from test results; these test results provide a range of stiffness values which would be acceptable for mid-shaft section 130 applicable to a multi-modality OCT (MMOCT) catheter, according one or more embodiments disclosed herein.

TABLE 1

MMOCT Mid-shaft Taber Stiffness Data

| Sample Type | Average Stiffness (mN-m) | Min Stiffness (mN-m) | Max Stiffness (mN-m) | STDEV |
|---|---|---|---|---|
| Hypotube Mid-shaft (Distal), N = 15 | 0.18 | 0.17 | 0.2 | 0.01 |

TABLE 1-continued

MMOCT Mid-shaft Taber Stiffness Data

| Sample Type | Average Stiffness (mN-m) | Min Stiffness (mN-m) | Max Stiffness (mN-m) | STDEV |
|---|---|---|---|---|
| Hypotube Mid-shaft (Proximal), N = 15 | 4.69 | 4.41 | 5 | 0.173 |

Examples of Viable Catheter Sheath Materials for mid-shaft section 130. Coronary imaging catheters are generally provided as Intravascular Ultrasound (IVUS) catheters or Optical Coherence Tomography (OCT) imaging catheters. Both types of imaging catheters can benefit from lubricious, low friction materials because both utilize rotating and/or translating imaging cores to acquire images of a patient's anatomy (e.g., coronary vessels). Images acquired from either type of imaging catheter (IVUS or OCT) should ideally be artifact-free to facilitate accurate diagnosis of disease state(s). Although materials for fabricating the mid-shaft section of IVUS and OCT imaging catheters are well known, the difference in principles of operation between IVUS and OCT can significantly distinguish the material necessary to fabricate the window section 120 for these two types of catheters.

IVUS catheters can acquire images through blood, so no clearance of blood is required. In the IVUS type of catheter, the acoustic impedance (Z) of the window material is critical. Therefore, polyethylene (PE), particularly medium density PE would be considered as one example of an ideal imaging window material. If the acoustic impedance is not a good match for blood, there will be visible image artifacts that could mislead clinicians or make their job of evaluating images of coronary vessels difficult. This is due to imperfect transfer of acoustic energy through the catheter sheath, blood and vessel tissue, different types of plaque, etc., because the impedance is not well matched as acoustic energy propagates into vessel walls and back into the transducer.

OCT imaging catheters utilize electromagnetic radiation in a wavelength range of about 900 to 1300 nanometers (nm). Therefore, the refractive index (n) of the imaging window material is an important parameter to consider for fabricating catheters that can obtain artifact-free OCT images. In OCT imaging, because the average size of blood cells is close to the wavelengths of radiation commonly used in OCT imaging, the blood must be displaced by flushing media for good OCT imaging. One example of flushing media used to displace blood is contrast agent. A type of contrast agent called Renografin, which is diatrizoate meglumine and diatrizoate sodium injection, is sometime used. Therefore, the material for the window section 120 of an OCT catheter must be chosen by considering the wavelengths and refractive index of contrast agents most generally used in OCT imaging. Otherwise, similar to IVUS catheters, if the refractive index of the optical imaging window material is not well matched to that of the contrast agent and/or tissue, imaging artifacts can occur that may interfere with optimal imaging and diagnosis.

In addition, in imaging catheters configured for multi-modality OCT imaging (MMOCT imaging), it is often needed to image soft tissue via fluoroscopy. Therefore, in this case too, the viscosity and refractive index closely matching that of blood and contrast media is most commonly used to displace blood during OCT-fluoroscopy multi-modality imaging of coronary vessels.

OCT imaging window materials should closely match the refractive index of contrast agents, blood, and vessel tissues. Commonly used window materials include certain grades of cyclic co-polymers (COPs) such as TOPAS® COC, certain grades of polyethylene, polypropylene, styrene, urethane, polycarbonate, PEBAX® block copolymers, PMMA, ULTEM, OKP-4 and Zeonex®, plus other semi-flexible materials commonly used for plastic optics. Again, a refractive index between about 1.40-1.60, and preferably about 1.47-1.53, can help create artifact-free images due to their refractive index match with that of blood, contrast agents, and/or bodily tissues. That is, according to at least one embodiment, the window section (120) is made of polymeric material that substantially matches the refractive index of one or more of a contrast agent, blood, and vessel tissue, and the polymeric material has a refractive index in a range of about 1.40 to 1.60, and preferably in a range between 1.47 to 1.53. Since safety is most important in medical imaging catheters, catheter sheath materials that meet tensile guidelines are best to ensure that catheters remain intact during imaging procedures.

Certain imaging catheters also detect auto-fluorescence, light emitted by tissue following irradiation by certain electro-magnetic wavelengths, or fluorescence of applied fluorescent dies or agents that target various tissues and fluoresce at known wavelengths. These imaging catheter sheaths must be constructed with materials that themselves do not fluoresce, which could interfere with the efficient detection of low-level fluorescence of tissues.

Imaging core properties that contribute to tracking and navigation capabilities depend on specific applications. In the case of catheters that employ a rotating core, certain design considerations contribute to improved navigation capabilities, including relatively low lateral imaging core stiffness, so the imaging core does not dominate the stiffness of the window segment. Properly designed imaging core properties contribute to excellent navigation capabilities. For example, low lateral/bending rigidity can be achieved if the imaging core does not dominate sheath stiffness. Therefore, a short rigid length distal to the housing of rotating imaging core will not bind or kink the window section even in tight tortuosity. The imaging core is often provided with one or more radiopaque markers. The imaging core tip marker denotes the location of the imaging plane and is attached to the distal end of the drive cable, and therefore does not build up or add to the profile of the imaging core, keeping the overall profile of the device low.

<Proximal Portion 140>

The importance of optimized stiffness and diameter ratios of the various segments of the catheter sheath is described next in greater detail. Catheter optimized characteristics together with low-friction coatings allow adequate pushability (column strength), crush and ovalization resistance (hoop strength), and easy navigation in tortuous anatomies, while maintaining adequate lateral flexibility to conform to tortuous anatomy. Like the intraluminal tortuous paths that the catheter navigates in and through, the catheter sheath tapers both in profile and stiffness to meet the needs of each segment.

<Exemplary Types of Catheter>

As discussed above, the flex modulus varies inversely with the diameter of the catheter shaft. The wall thickness of the catheter shaft should also track catheter diameter to reduce the chances that the sheath would kink during use. For coronary catheters, such as Percutaneous Coronary Intervention (PCI) catheters, a ratio of inner diameter to wall thickness of about 0.15 to 0.20 would be advantageous to prevent kinking in unsupported areas of the catheter such as the gap formed at the distal end of the window lumen beyond the imaging core tip.

For smaller diameter catheters such as neuro access catheters particular considerations must be taken into account. For example, for small profile catheters such as intracranial access (ICA) catheters, the distal end with very small profile, on the order of 1Fr-1.6Fr (diameters of about 0.0131 to 0.0197 inches) are preferable. Catheters of this size must taper in both profile and stiffness, similar to coronary catheters. To achieve good pushability, small profile catheters use stiffer materials including mechanical reinforcement with braid or served wires within the wall of the catheter, particularly in the mid-shaft section 130. The mid-shaft section 130 tapers in stiffness along with the profile, so that there is a smooth stiffness transition from the mid-shaft section to the window section at the distal end of the shaft without a step in outer profile or in lateral stiffness. In one or more embodiments, tapered stiffness is achieved through the use of a helically slotted hypotube encapsulated within the mid-shaft section wall of the sheath section 190. In alternative embodiments, served (coiled) wires within the wall of the distal window section 120 can be used to keep the wall thickness and profile to a minimum while providing crush resistance and preventing ovalization in tight bends. Metallic reinforcement for the window section 120 should be carefully used in imaging applications because light and sound do not readily penetrate through metals like steel.

Catheters for ICA applications are very delicate, and vessels that offer access tend to be very tortuous, so the catheter relies heavily on smaller profile to reduce relative stiffness, with effective stiffness lower than that of coronary catheters, but not proportionally lower because the smaller profile reduces stiffness on its own without reducing flex modulus. More specifically, the Rx segment 110 at the distal end of ICA catheters is even softer and longer than a counterpart Rx segment of a coronary catheter because the blood vessels in intracranial access are smaller and more delicate and tortuous than coronaries arteries. Therefore, ICA catheters rely even more heavily on tapered stiffness and low-friction coatings such as hydrophilic coatings to conform and navigate through tortuous delicate vessels.

Catheters intended for peripheral use. Catheters intended for peripheral use are generally larger and stiffer than either of the above examples, of PCI or ICA catheters. Peripheral use catheters generally access larger vessels, and utilize larger profile guide catheters (e.g., 8 Fr) and larger guidewires (e.g., guidewires of 0.025 or 0.035 inch diameters) to guide a given catheter into place. These catheters may use polymers that are in the range of hardness durometer of about 63 D to 72 D Shore, similar to the durometer values of PCI or ICA catheters. However, since peripheral use catheters have a larger profile with thicker walls, these catheters can be sufficiently stiffer laterally without using materials with higher durometer values.

Generally peripheral catheters are much larger profile than coronary or intracranial access catheters, so they need the much larger and stiffer guidewires to effectively guide them into place. There is so much extra space available in peripheral larger vessels that some of these catheters do not even use an Rx configuration. In some applications, peripheral catheters may rather use 'over the wire' configuration catheters that have a very long guidewire lumen that may run the full length of the catheter. This not only increases the catheter profile, but also requires a much longer guidewire, and sometimes two operators to operate the guidewire and catheter. It is not necessary to describe in detail the structure of over-the-wire (OTW) catheters because this disclosure focuses on catheters having a long catheter sheath section and a short Rx segment. However, the details of the present disclosure directed to the tapered stiffness, tapered durometer values, and catheter diameter to wall-thickness ratios may very well be applicable to OTW catheters too.

Peripheral catheters may need to be torqueable unlike Rx-type catheters. Torquability is a property usually not considered for Rx-type catheters. However, according to the various embodiments of the present disclosure, torqueability (or prevention of torquability) may be an important aspect, in particular for imaging catheters comprising a rotating imaging core. Catheters reinforced with braided and/or served (coiled) wires, and sometimes reinforced by helically slotted hypotubes within the mid-shaft wall are utilized to efficiently transfer torque from the proximal to the distal end to facilitate excellent navigation through tortuous anatomy. These reinforcement techniques also prevent crushing, and serve to resist ovalization of the catheter, which is important if there is an obturator or a rotating mechanism (e.g., for imaging catheters) inside the sheath that must move freely. An obturator (also called stiffening cannula) is a removable inner-diameter (ID) support that helps stiffen and support the ID of thin-walled catheters that are then entirely removed from the catheter after reaching the desired site of interest, providing the largest open ID possible via thin-walled construction.

In an embodiment of a multimodality OCT (MMOCT) catheter, the inner diameter centerline (or lumen axis) of the Rx segment is offset from the window lumen centerline to allow the Rx segment to slide freely on the guidewire with little frictional resistance. The Rx segment centerline is also slightly angled from the centerline of the window segment during manufacture. However, this small angle straightens out when the catheter is within the guide catheter and/or in tight vessels due to the softer durometer of the Rx segment. This results in easier lateral stiffness of the Rx segment, and seamless transition of stiffness from the window segment to the Rx segment or vice versa. Since the guidewire is stiffer laterally and both the guidewire and catheter are constrained within a lumen, the catheter must readily conform to any tortuous anatomy in order to slide freely within the lumen. The offset centerlines and angled Rx arrangement permit this free relative movement between catheter and guidewire and patient lumen (anatomy) by reducing the amount of contact between the guidewire and the imaging window section (the catheter portion immediately proximal to the Rx segment).

<Imaging System>

FIG. 7A illustrates an exemplary catheter-based imaging system 700. FIG. 7B shows an arrangement of the catheter 100 in a use environment. The imaging system 700 includes a system console 710 and a catheter too. A patient interface unit (PIU) 720 connects the catheter too to the system console 710 using a cable bundle 719. The system console 710 includes, among other things, a computer cart 702 and one or more display devices 704. The system console 710 includes a computer system 706. The catheter too may include, for example, a fiber-optic based imaging core 200 arranged inside a working channel of a catheter sheath 190. The catheter sheath 190 is connected at the proximal end thereof to the PIU 720 via a catheter handle 150 which may include a fiber connector 152, and one or more access ports 151. The catheter handle 150 removably engages the catheter too to the PIU 720. The PIU 720 may include a fiber optics rotary joint 721 and a user interface 722. FIG. 7B shows the Rx segment 110 and the window section 120 inside an anatomical lumen 750. As shown in FIG. 7B, the guidewire 300 can pass through the second lumen LM2 (guidewire lumen) substantially without friction, and the first lumen and second lumen remain substantially parallel to each other while being offset by a distance ΔLM.

In the foregoing description, a specific combination of catheter sheath 190 and rapid exchange segment 110 that are either desirable or necessary for safe and efficient catheter navigation through tortuous anatomy are disclosed. The catheter attributes are intended for generic catheter sheaths, imaging catheter sheaths, etc., including, but not limited to; intra-coronary catheters, intra-cranial catheters, peripheral catheters, and all Rx design catheters.

Some of advantages of the catheter described herein are that this combination of attributes and design features create a catheter with the ability to successfully navigate into and through tortuous anatomy such as the circumflex artery, one example of coronary vasculature tortuosity not usually accessible with coronary imaging catheters on the market today. Other advantages include ease of use and fast navigation that is afforded by the substantial rigidity and solid feel of the proximal portion of the mid-shaft section, which allows quick introduction to the site of interest and confidence that the catheter will not be damaged via kinking as observed on conventional catheter designs.

The axis of the guidewire lumen is offset by an offset distance from, and angled with respect to, the axis of the sheath. This offset distance, for several reasons enhances guidewire tracking by reducing the need for the guidewire to bend to conform to the sheath while positioned within the guide catheter and/or patient anatomy, such as coronary vessels. Conventionally, the guidewire stiffness accounts for most of the lateral rigidity of the catheter assembly. In contrast, according to the present disclosure, a relatively straight path for the guidewire is provided through the Rx segment and out of the exit port. Since the guide catheter lumen constrains the two devices (catheter and guidewire) together in a small space, it is necessary to provide an offset between the guidewire lumen centerline and the sheath's window centerline so that both the guidewire and sheath can lay parallel within a constricted space, so the sheath can slide freely over the guidewire with minimal frictional resistance. In the present disclosure, the offset distance between the axes of the sheath and guidewire lumen is just enough to allow the guidewire to remain mostly straight as it passes through the Rx segment, which is constrained within guide catheter and/or anatomical lumen of, e.g., a coronary artery. Given an exemplary coronary guidewire of 0.014 inch diameter and, for a disclosed catheter with a window profile of 0.031 inch diameter, the offset distance between the axes of first and second lumens should be in a range of about 0.024 to 0.026 inches to provide sufficient frictionless navigation on the guidewire.

The Rx section 110 is angled with respect to the centerline of the sheath section (i.e., the window section, which is the portion of the sheath nearest to the Rx segment). The benefits of the angled Rx segment are felt in both the manufacturing process and also in use of the resulting catheter. In the manufacturing process, the Rx segment with its angled junction is formed in a molding step where the angle makes it easier to machine the mold. In use, due to the tailored flexibility of the window section and the Rx section, the angled Rx segment and/or the sheath is straightened by the internal diameter of the guide catheter and/or anatomical vessel in which the catheter is operating.

In manufacturing, as the Rx segment is melt-bonded to the window section, the angle may be slightly reduced due to the heat shrink tube constraint, similar to the way the guide catheter constrains the Sheath/Guidewire Assembly. As the Rx segment in inserted into the guide catheter and then guided through a bodily lumen, the angle between the Rx segment and Window section gets straightened due to the constraint within the guide catheter inner diameter. This flexure tends to enhance the offset between the Rx segment and window section, contributing to improved near-frictionless movement of the guidewire relative to the Rx and window segments.

FIG. 8A shows an example embodiment of the rapid exchange section 110 without the distal tip 112 prior to assembly with the catheter sheath 190. FIG. 8B shows an example embodiment of the rapid exchange section 110 after assembly with the distal tip 112, and prior to assembly with the catheter sheath 190. The rapid exchange section 110 can be made by known processes, such as extrusion or injection molding or additive manufacturing (3D printing). In the example embodiment of FIG. 8A, the rapid exchange section 110 includes an entry port 118, and exit port 118, a connecting structure in the form of a joint 115 which includes a proximal stub 115a. In the example embodiment of FIG. 8B, the rapid exchange section 110 includes an entry port 118, and exit port 118, a distal tip 112, one or more radiopaque marker bands 113, and connecting structure formed by the joint 115, and proximal stub 115a. The proximal stub 115a of the molded Rx segment is inserted into the open distal end of tubular sheath and melt-bonded therein. Although in at least some applications, the catheter can be used by assembling the Rx segment shown in FIG. 8A to the catheter sheath 190, in other embodiments, the Rx segment shown in FIG. 8B is assembled with the catheter sheath 190 to form a monolithic cylindrical shaft. Once the attachment stub 115a of the Rx section 110 goes into the window lumen and is melt-bonded therein to the distal end of the catheter sheath 190 the entire catheter becomes a monolithic shaft having a first lumen LM1 and second lumen LM2, which are offset and angled with respect to each other.

As previously noted above, during manufacture (assembly) only a small space of the open lumen LM1 remains unsupported to allow for accommodation of the imaging core prior to a procedure. Specifically, the imaging core 200 is arranged inside the first lumen LM1 at a predetermined distance 219 from the distal end thereof, so as to form only a small unsupported area 220 within the first lumen. However, the distal end of the first lumen LM1 is completely sealed and has no bent or access for any fluids. In one embodiment, the length of the window section not containing the imaging core is less than 10 mm. In other embodiments, the length of the window section not containing the imaging core is less than 5 mm, or the length of the window section not containing the imaging core can be less than 2 mm and greater than 1 mm.

Conventional catheters of this type are generally designed to be filled with saline or other fluids. Therefore, that type of conventional catheters need to have a small distal lumen to vent fluids like air or saline, and may also have a luer sidearm fitting and a distal bearing. These factors increase the overall diameter of the catheter. According to at least one embodiment of the present disclosure, the catheter is air filled, and does not have a vent hole (does not have any outlet or opening), and does not have a bearing or a luer fitting as shown in the several figures. Therefore, the resulting catheter can have an overall smaller diameter at a more affordable cost. Moreover, since the catheter disclosed herein can have sufficient lateral flexibility, optimal pushability, and crush resistance, the catheter is going to track better and more consistently, can have less variation in diameter, will yield less NURD, and ultimately will cost less. Hence, one or more embodiments of the catheter disclosed herein also omits the undesirable clinical step of filling the catheter with liquid, and purging any bubbles that may reside within the liquid that would interfere with ideal imaging.

The foregoing disclosure presents novel and advantageous features for intra-coronary catheters, intra-cranial catheters, peripheral catheters, and all Rx-design catheters. Three main features common to most of these catheters are disclosed, including, (1) flexural modulus and diameter to wall-thickness ratio combined with and gap control in the unsupported area of the catheter lumen; (2) catheter configuration of the sheath section with tapered stiffness profile and offset/angled Rx segment; (3) catheter materials, coatings, and friction-reducing designs. Additional advantageous features include, but are not limited to:

Flex modulus—laterally soft enough to conform to tight bends in tortuous anatomy, and axially rigid enough to have adequate column strength to resist kinking and crushing of the inner diameter (ID).

Inner Diameter and wall-thickness relationship of the window section—The aspect ratio of wall thickness to Inner Diameter, held between 0.15 and 0.20, is important to minimize risk of kinking, while yielding adequate crush resistance and column strength when the hardness durometer is set at about 72 D Shore (Flex. Modulus=<500 MPa) in the window segment.

Smooth distal tip—An atraumatic distal tip is important to ensure that the catheter does not damage sensitive arteries and/or disrupted plaque resulting from angioplasty procedures. The distal tip of the Rx segment is softer, tapered to a thin wall, has radiused ports to avoid catching on stent struts or calcified plaque, and the inner diameter of the guidewire lumen hugs the guidewire with just enough clearance for substantially frictionless movement. All of these features lead to an atraumatic distal tip without sharp edges or flash.

Concentricity—Notably in the window segment, concentricity is important because the window material changes the incident angle and affects the beam properties of light traveling through the window. Large variations in wall thickness can be detrimental to measurement accuracy and system calibration.

Gap distance—Assembly of the imaging core requires an unsupported area proximal to the Rx segment and distal to the imaging core. Minimized gap between the distal end of the imaging core and the distal end of the imaging window lumen helps minimize risk of kinking and hinging at the un-supported gap area.

Defined angle between Rx segment centerline to window section center line—The angle between Rx segment centerline and the sheath centerline minimizes friction between the guidewire and sheath, allowing the guidewire to slide freely in the guidewire lumen, facilitating superior navigation properties and fast insertion to the site of interest.

Offset of Rx portion from window segment—The centerlines of the Rx segment and window section are offset from each other by a distance necessary to provide a straight path for the guidewire (GW) to minimize frictional resistance between guidewire and sheath. This allows the guidewire to slide freely in the GW lumen, facilitating superior navigation properties and fast insertion to the site of interest.

Stiffness of window portion—Window material durometer of about 70 D Shore to 72 D Shore, together with the wall thickness/Inner diameter aspect ratio of between 0.15 and 0.20, preferably 0.17, provide adequate column strength and kink resistance to facilitate ease of use, superior navigation properties, and adequate tensile strength to ensure that the catheter design is safe and not subject to undesirable failure modes.

Stiffness of Rx section—Stiffness of the Rx segment, while relatively close to that of the window segment, is softer to enable superior navigation properties, adequate tensile strength, flexibility and excellent kink resistance.

According to one or more embodiments, other features include but are not not limited to, a catheter comprising a catheter tube having, from distal end to proximal end: an exchange tip, an exchange portion, a window portion, a distal shaft portion and a proximal shaft portion. The window portion having an outer diameter (OD) of approximately 0.0310" and a wall thickness of approximately 0.0040". The window portion having a flex modulus of approximately 500 MPa and a hardness of Shore D72 durometer. The exchange portion having an OD of approximately 0.0300" and a wall-thickness of approximately 0.0070"; the exchange portion having a flex modulus of approximately 285 MPa and a hardness durometer of Shore D64. The exchange tip being part of the exchange portion and having an OD of approximately 0.030" tapering to approximately 0.022". The exchange tip having a flex modulus of approximately 77 MPa and having a hardness durometer of Shore D24.

According to one or more embodiments, other features include but are not limited to, a catheter comprising, from distal end to proximal end: an Rx segment, a window segment, and a catheter shaft segment. The Rx segment is comprised of an atraumatic tip and an exchange body portion. The window segment having a window for sideview imaging. The catheter shaft segment comprised of a distal shaft portion, mid-shaft portion, and a proximal shaft portion. The mid-shaft portion having high proximal stiffness and low distal stiffness, and having no abrupt stiffness transition to the distal shaft portion. The atraumatic tip having an entry port at the distal end thereof for a guidewire, the entry port having smooth and rounded edges radiused to hug the guidewire. The exchange body portion integrally attached to the atraumatic tip at the proximal side thereof and having an exit port for the guidewire, the exit port having smooth and rounded edges radiused to hug the guidewire. The window segment having an outer diameter (OD) and a wall-thickness, wherein ~0.0310" OD/0.0040" wall thickness=>Flex Mod ~500 MPa, approximately Shore 72 D durometer, and ~ 0.075 mN-m stiffness. The exchange body portion of the Rx segment having: ~0.0300" OD/0.0070" wall thickness=>Flex Mod ~285 MPa, and ~Shore 64 D durometer. The atraumatic tip of the Rx segment tapers from ~0.030" to ~0.022", and has a Flex Mod ~77 MPa, and Shore 42 D durometer.

According to one or more embodiments, other features include but are not limited to, the catheter further comprising: an imaging core arranged within the first lumen through the proximal portion, the mid-shaft portion and at least partially through the window portion, such that an unsupported area is formed at the distal end of the first lumen. A catheter, wherein the mid-shaft portion comprises a hypotube body having a helical slot enclosed with a first polymer layer on an inner surface of the hypotube body, and a second polymer layer an outer surface of the hypotube body, and wherein a cut pattern of the helical slot has a varying pitch that changes gradually from a first pitch at the proximal portion to a second pitch at or near a distal end of the hypotube body. A catheter, wherein the sheath has a stiffness of about 4.7 mN-m at the proximal portion thereof, and the stiffness gradually tapers to about 0.18 mN-m at the distal end thereof. A catheter, wherein the hypotube body enclosed in the first and second polymer layers forms a catheter body with a diameter profile in a range of 3.0 to 6.0 Fr, and wherein the rapid exchange portion has a diameter profile in a range of 1.0 Fr to 1.6 Fr, or in a range of about 0.0131 to 0.0197 inches.

According to one or more embodiments, other features include but are not limited to, a catheter, wherein the tubular sheath and the exchange segment are mated together such that a longitudinal axis of the guidewire lumen and a longitudinal axis of the tool lumen are arranged at an angle of about 2 to 9 degrees with respect to each other. A catheter, wherein the distal portion of the tubular sheath has an outer diameter of approximately 0.0310 inches and a wall thickness of approximately 0.0040 inches, and wherein the distal portion of the tubular sheath has a flexural modulus of approximately 500 MPa and a hardness durometer of about 72 D Shore. A catheter, wherein the exchange segment has an outer diameter of approximately 0.0300 inches and a wall thickness of approximately 0.0070 inches, and wherein the exchange segment has a flexural modulus of approximately 285 MPa and a hardness durometer of about 64 D Shore. A catheter, wherein the exchange segment has an outer diameter of approximately 0.030 inches at a proximal end thereof and the outer diameter tapers to approximately 0.022 inches at a distal end thereof. A catheter, wherein the exchange segment includes a distal tip, and wherein the distal tip has a flexural modulus of approximately 77 MPa and a hardness durometer of about 42 D Shore, and wherein the distal tip has an outer diameter that tapers in a direction from the proximal end to distal end from about 0.030 inches to about 0.022 inches.

In referring to the description, specific details are set forth in order to provide a thorough understanding of the examples disclosed. In other instances, well-known methods, procedures, components and circuits have not been described in detail as not to unnecessarily lengthen the present disclosure. Unless defined otherwise herein, all technical and scientific terms used herein have the same meaning as commonly understood by one of ordinary skill in the art to which this invention belongs. The breadth of the present invention is not to be limited by the subject specification, but rather by the plain meaning of the claim terms employed.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A catheter, comprising:
   a tubular sheath defining a first lumen which extends from a proximal end to a distal end of the tubular sheath, wherein a stiffness of the tubular sheath tapers from a higher stiffness at the proximal end to a lower stiffness at the distal end; and
   a rapid exchange segment configured to attach to the distal end of the tubular sheath, the rapid exchange segment defining a second lumen which extends from a distal entry port to a proximal exit port of the rapid exchange segment,
   wherein the rapid exchange segment has a soft and atraumatic distal tip and has an angled joint or a stub portion angled with respect to the second lumen, and the stub portion is mated with the tubular sheath in a lengthwise direction such that the stub portion of the rapid exchange segment connects with the distal end of the tubular sheath,
   wherein the rapid exchange segment is a monolithic structure comprised of the stub portion (A), a tubular body (B), and a distal tip (C) arranged in this order distally to the tubular sheath,
   wherein the second lumen connects the distal entry port located at the distal tip with the proximal exit port located on a side of the stub portion at a proximal end of the tubular body,
   wherein the rapid exchange segment has an outer diameter tapered in the lengthwise direction of the tubular body such that a first outer diameter OD1 at the proximal end of the tubular body is larger than a second outer diameter OD2 at a distal end of the tubular body,
   wherein the second lumen is tapered from the distal entry port to the proximal exit port by having an inner diameter tapered from the exit port to the entry port such that a first inner diameter ID1 at the exit port is smaller than a second inner diameter ID2 at the entry port of the rapid exchange segment,
   wherein the outer diameter of the rapid exchange segment and the inner diameter of the second lumen are inversely tapered from the distal tip such that OD2<OD1 and ID1<ID2, ID2 is concentric with OD2, and ID1 is not concentric with OD1,
   wherein the second lumen is offset with respect to the outer diameter of the rapid exchange segment on at least at one of the entry port and the exit port,
   wherein the tubular sheath and the rapid exchange segment are mated together offset from each other such that an axis of the second lumen and an axis of the first lumen are arranged at an angle with respect to each other, and
   wherein the stub portion of the rapid exchange segment is inserted into an opening in the distal end of the first lumen of the tubular sheath.

2. The catheter according to claim 1,
   wherein the stub portion of the rapid exchange segment is inserted into the first lumen of the tubular sheath and melt-bonded therein to form a monolithic catheter structure comprised of the tubular sheath and the rapid exchange segment.

3. The catheter according to claim 2,
   wherein the angle between the axis of the second lumen and the axis of the first lumen is in a range of about 1 to 15 degrees.

4. The catheter according to claim 2,
   wherein the second lumen has an inner diameter configured to pass therethrough a guidewire of a predetermined diameter, and
   wherein the axis of the first lumen and the axis of the second lumen are offset from each other by an offset distance in a range of about half to about twice the predetermined diameter of the guidewire.

5. The catheter according to claim 1,
wherein the rapid exchange segment has a hardness durometer of about 64 D Shore at the stub portion, and the hardness durometer tapers in a lengthwise direction of the tubular body to a hardness durometer of about 42 D Shore at the distal tip, and
wherein the tubular body has a flexural modulus of about 285 MPa, and the distal tip has a flexural modulus of about 77 MPa.

6. The catheter according to claim 1,
wherein the distal tip is tapered from the second outer diameter to a third outer diameter, and the third outer diameter is substantially equal to a diameter of the entry port.

7. The catheter according to claim 1,
wherein the tubular body has an outer diameter in a range of about 0.0250 to about 0.030 inches, and
wherein the distal tip has an outer diameter that tapers from about 0.030 inches to about 0.022 inches.

8. The catheter according to claim 1,
wherein the entry port is centered and coaxial with the outer diameter of the distal tip, and the exit port is neither centered nor coaxial with the outer diameter of the proximal end of the rapid exchange segment.

9. The catheter according to claim 1,
wherein the tubular body of the rapid exchange segment has an outer diameter of about 0.0250 to 0.0300 inches, a wall-thickness of about 0.0070 inches, and a flexural modulus of about 285 MPa,
wherein the distal tip of the rapid exchange segment has an outer diameter that tapers from about 0.030 inches to about 0.022 inches, a flexural modulus of about 77 MPa, and a hardness durometer of about 42 D Shore, and
wherein the hardness durometer of the tubular body varies from about 64 D Shore at the proximal end thereof to about 63 D Shore at the distal end thereof.

10. The catheter according to claim 1,
wherein the tubular body of the rapid exchange segment has a diameter in a range of about 1.0 Fr to 1.6 Fr or a diameter in a range of about 0.0131 inches to 0.0197 inches.

11. The catheter according to claim 1,
wherein the rapid exchange segment includes one or more radiopaque marker bands configured to be visible under fluoroscopic imaging guided navigation of the catheter, and
wherein at least one radiopaque marker band is embedded within the tubular body of the rapid exchange segment.

12. The catheter according to claim 1,
wherein the tubular sheath includes, in order from the proximal end to the distal end thereof, a proximal section, a mid-shaft section and a window section, and
wherein the first lumen extends from the proximal section through the mid-shaft section and partially through the window section.

13. The catheter according to claim 12,
wherein the proximal section of the tubular sheath has a stiffness in a range from about 5.0 to about 4.41 milli-Newton-meters (mN-m), and the stiffness of the tubular sheath gradually tapers towards the distal end of the mid-shaft section to a stiffness in a range of about 0.20 to about 0.17 mN-m.

14. The catheter according to claim 12,
wherein the tubular sheath comprises a hypotube sandwiched between layers of polymer material,
wherein the hypotube extends from the proximal section to the distal end of the mid-shaft section without reaching the window section, and
wherein the hypotube includes a helicoidal slot cut at a pitch that varies gradually from a first pitch at the proximal section to a second pitch smaller than the first pitch at a distal end of the mid-shaft section.

15. The catheter according to claim 12,
wherein the window section is a cylindrical window section which has an outer diameter of about 0.0310 inches and a wall-thickness of about 0.0040 inches, a flexural modulus of about 500 MPa, a hardness durometer of about 72 D Shore, and a stiffness of about 0.075 mN-m.

16. The catheter according to claim 12, further comprising:
an imaging core arranged in the first lumen through the proximal section, the mid-shaft section and at least partially through the window section, and
wherein a length of the window section not containing the imaging core is in a range of about 10 mm to about 1.0 mm.

17. The catheter according to claim 12,
wherein the window section is a cylindrical window section which has a wall-thickness to inner-diameter ratio in a range of about 0.150 to about 0.20, a flexural modulus of about 500 MPa, a hardness durometer of about 72 D Shore, and a stiffness in a range of about 0.06 to about 0.09 mN-m.

18. The catheter according to claim 12,
wherein the window section is made of polymeric material that substantially matches a refractive index of one or more of a contrast agent, blood, and vessel tissue,
wherein the polymeric material has a refractive index in a range of about 1.40 to about 1.60, and
wherein the window section and the rapid exchange segment both include surfaces made of friction-reducing material or surfaces that are coated with a low-friction hydrophilic coating.

19. The catheter according to claim 12, further comprising:
an imaging core arranged inside the first lumen at a predetermined distance from the distal end thereof, so as to form an unsupported area within the first lumen,
wherein the imaging core is configured to transmit and collect electromagnetic radiation of one or more wavelengths through the window section.

20. The catheter according to claim 12, further comprising:
a rotatable imaging core arranged within the first lumen at a predetermined distance from the distal end of the tubular sheath, so as to form an unsupported area within the first lumen,
wherein the imaging core is configured to rotate about an axis of the first lumen and to translate longitudinally parallel to the axis of the first lumen while transmitting and collecting electromagnetic radiation of one or more wavelengths through the window section.

21. A catheter, comprising:
a sheath having a first lumen, wherein a stiffness of the sheath tapers from a higher stiffness at a proximal end to a lower stiffness at a distal end; and
a rapid exchange segment having a second lumen which extends from a distal entry port to a proximal exit port of the rapid exchange segment, wherein the sheath and the rapid exchange segment are attached to each other in a lengthwise direction such that the second lumen is offset and angled with respect to the first lumen, wherein the rapid exchange segment has an angled joint or a proximal stub, a tubular shaft, and a soft and atraumatic distal tip, and the proximal stub is slightly angled with respect to the tubular shaft, and the distal tip is smooth without sharp edges or flash, wherein the sheath comprises a proximal portion, a mid-shaft portion, and a window portion, wherein the first lumen extends from the proximal portion through the mid-shaft portion and at least partially through the window portion, wherein the rapid exchange segment is a monolithic structure comprised of the stub portion (A), a tubular body (B), and a distal tip (C) arranged in this order distally to the sheath, wherein the second lumen connects the distal entry port located at the distal tip with the proximal exit port located on a side of the stub portion at a proximal end of the tubular body, wherein the rapid exchange segment has an outer diameter tapered in the lengthwise direction of the tubular body such that a first outer diameter OD1 at the proximal end of the tubular body is larger than a second outer diameter OD2 at a distal end of the tubular body, wherein the second lumen is tapered from the distal entry port to the proximal exit port by having an inner diameter tapered from the exit port to the entry port such that a first inner diameter ID1 at the exit port is smaller than a second inner diameter ID2 at the entry port of the rapid exchange segment, wherein the outer diameter of the rapid exchange segment and the inner diameter of the second lumen are inversely tapered from the distal tip such that OD2<OD1 and ID1<ID2, ID2 is concentric with OD2, and ID1 is not concentric with OD1, wherein the second lumen is offset with respect to the outer diameter of the rapid exchange segment on at least at one of the entry port and the exit port, and wherein the proximal stub of the rapid exchange segment is mated with the sheath at the distal end of the first lumen by inserting the proximal stub into an opening in the window portion of the sheath.

22. A catheter, comprising:

a tubular sheath having an outer surface and an inner surface arranged coaxially to each other and defining a wall that encloses a tool lumen that extends from a proximal end to a distal end of the tubular sheath, wherein a stiffness of the tubular sheath tapers from a higher stiffness at the proximal end to a lower stiffness at the distal end; and an exchange segment having an outer surface and an inner surface arranged at least partially coaxially to each other and defining a wall that encloses a guidewire lumen, wherein the tubular sheath includes, in order from the proximal end to the distal end, a proximal section, a mid-shaft section, and a distal section, wherein the distal section of the tubular sheath includes a transparent window for side-view imaging, wherein the tool lumen extends from the proximal portion through the mid-shaft section and partially through the distal section, wherein the exchange segment has a soft and atraumatic distal tip and has an angled joint or a proximal stub, and the angled joint or the proximal stub is mated with the tubular sheath at the distal end thereof in such a manner that the angled joint or the proximal stub is inserted into an opening in the distal end of the tubular sheath and the exchange segment and the tubular sheath partially overlap each other at an angle and the guidewire lumen is offset with respect to the tool lumen by a predetermined distance to form a monolithic catheter structure comprised of the tubular sheath and the rapid exchange segment, wherein the monolithic structure comprises the proximal stub (A), a tubular body (B), and a distal tip (C) arranged in this order distally to the tubular sheath, wherein the guidewire lumen connects a distal entry port located at the distal tip with a proximal exit port located on a side of the stub portion at a proximal end of the tubular body, wherein the exchange segment has an outer diameter tapered in the lengthwise direction of the tubular body such that a first outer diameter OD1 at the proximal end of the tubular body is larger than a second outer diameter OD2 at a distal end of the tubular body, wherein the guidewire lumen is tapered from the distal entry port to the proximal exit port by having an inner diameter tapered from the exit port to the entry port such that a first inner diameter ID1 at the exit port is smaller than a second inner diameter ID2 at the entry port of the exchange segment, wherein the outer diameter of the exchange segment and the inner diameter of the guidewire lumen is inversely tapered from the distal tip to the proximal end of the tubular body such that OD2<OD1 and ID1<ID2, ID2 is concentric with OD2, and ID1 is not concentric with OD1, and wherein the guidewire lumen is offset with respect to the outer diameter of the exchange segment on at least at one of the entry port and the exit port.

* * * * *